(12) United States Patent
Kurapati et al.

(10) Patent No.: US 10,102,252 B2
(45) Date of Patent: *Oct. 16, 2018

(54) METHOD AND SYSTEM FOR STANDARDIZATION OF WEARABLE DEVICE MEASUREMENT

(71) Applicant: MasterCard International Incorporated, Purchase, NY (US)

(72) Inventors: Kaushal Kurapati, Cupertino, CA (US); Akshit Shah, Santa Clara, CA (US); Priyank Gandhi, Sunnyvale, CA (US); Pankaj Rajendra Dubey, San Jose, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 366 days.

This patent is subject to a terminal disclaimer.

(21) Appl. No.: 15/045,945

(22) Filed: Feb. 17, 2016

(65) Prior Publication Data
US 2017/0235797 A1 Aug. 17, 2017

(51) Int. Cl.
G06F 17/30 (2006.01)
G06F 1/16 (2006.01)
G06Q 10/00 (2012.01)

(52) U.S. Cl.
CPC ........ *G06F 17/30528* (2013.01); *G06F 1/163* (2013.01); *G06Q 10/00* (2013.01)

(58) Field of Classification Search
CPC combination set(s) only.
See application file for complete search history.

(56) References Cited

U.S. PATENT DOCUMENTS

| | | | |
|---|---|---|---|
| 2010/0222645 A1* | 9/2010 | Nadler | A61B 5/1112 600/300 |
| 2013/0073368 A1 | 3/2013 | Squires | |
| 2014/0244009 A1* | 8/2014 | Mestas | A63B 24/0062 700/91 |

(Continued)

OTHER PUBLICATIONS

International Search Report and Written Opinion issued by the International Search Authority dated Mar. 30, 2017 in corresponding PCT Application No. PCT/US2017/016153 (13 pages).

(Continued)

*Primary Examiner* — Shyue Jiunn Hwa
(74) *Attorney, Agent, or Firm* — Buchanan Ingersoll & Rooney PC

(57) ABSTRACT

A method for establishing trigger events for wearable computing device activity includes: receiving a trigger event submission, the trigger event submission including at least an activity unit type, one or more activity unit values, and an application identifier associated with an application program corresponding to a wearable computing device; storing an activity unit profile, wherein the activity unit profile includes at least the application identifier and the activity unit type; storing a trigger profile for each activity unit value of the one or more activity unit values, wherein each trigger profile includes at least the application identifier and the respective activity unit value; and electronically transmitting a confirmation notification indicative of confirmation of storage of the trigger profile for each activity unit value to the computing device.

16 Claims, 11 Drawing Sheets

(56) References Cited

U.S. PATENT DOCUMENTS

2016/0048880 A1* 2/2016 Linden ............... G06Q 30/0241
                                                        705/14.66
2017/0193501 A1* 7/2017 Cole .................... G06Q 20/401

OTHER PUBLICATIONS

U.S. Appl. No. 15/046,015, filed Feb. 17, 2016.
U.S. Appl. No. 15/045,889, filed Feb. 17, 2016.

* cited by examiner

METHOD AND SYSTEM FOR STANDARDIZATION OF WEARABLE DEVICE MEASUREMENT

FIELD

The present disclosure relates to a platform for activity measurement using wearable computing devices, specifically the standardization of wearable device measurements, the identification of content based on wearable device activity, and the unification of wearable device activity with transaction data.

BACKGROUND

For as long as there has been human activity, there has been value in the measurement of that activity. Historically, people have been provided with various opportunities, rewards, advantages, and other incentives as a result of their activity, be it physical or otherwise. For example, the more products that a craftsman creates, the more revenue and/or recognition he may receive. In another example, a runner who completes a course the fastest or runs the furthest in a set amount of time may receive an award. In more modern times, many entities have sought to incentivize physical activity, such as by using computing applications to measure physical activity and judge a competition among users based thereon. For example, an application program associated with a pedometer may have a user compete against friends in seeing which person can walk the most steps in a day or week.

While wearable device providers often develop their own application programs that can provide incentives to their users, other entities not directly associated with the devices may have a desire to provide content to users based on their activity. For example, a shoe company may want to advertise shoes to heavy walkers. In another example, a sporting goods company may want to advertise sport products to runners, cyclists, and other athletes that are tied to their specific sport and activity level. However, these entities do not often have direct access to such information. In order to get this information, the entity (e.g., content provider) must contact the entity associated with the wearable computing device (e.g., device provider) and develop a system to receive activity data from that entity. This process must then be repeated for every other entity, every wearable computing device, and every type of activity. As a result, it is extremely inefficient, resource-intensive, and impractical for an entity to provide content based on user activity.

Thus, there is a need for a technical solution where activity data associated with a wearable computing device can be standardized in an automated fashion, such that content can be identified based on standardized activity. In addition, the use of standardization can also provide technical advantages in the marrying of activity data to other sources of data, such as transaction data, for more improved content distribution.

SUMMARY

The present disclosure provides a description of systems and methods for establishing trigger events for wearable computing device activity.

A method for establishing trigger events for wearable computing device activity includes: receiving, by a receiving device of a processing server, a data signal electronically transmitted by a computing device, wherein the data signal is superimposed with a trigger event submission, the trigger event submission including at least an activity unit type, one or more activity unit values, and an application identifier associated with an application program corresponding to a wearable computing device; storing, in a framework database of the processing server, an activity unit profile, wherein the activity unit profile is a structured data set including at least the application identifier and the activity unit type; storing, in a trigger database of the processing server, a trigger profile for each activity unit value of the one or more activity unit values, wherein each trigger profile is a structured data set including at least the application identifier and the respective activity unit value; and electronically transmitting, by a transmitting device of the processing server, a data signal superimposed with a confirmation notification indicative of confirmation of storage of the trigger profile for each activity unit value to the computing device.

A system for establishing trigger events for wearable computing device activity includes: a receiving device of a processing server configured to receive a data signal electronically transmitted by a computing device, wherein the data signal is superimposed with a trigger event submission, the trigger event submission including at least an activity unit type, one or more activity unit values, and an application identifier associated with an application program corresponding to a wearable computing device; a framework database of the processing server configured to store an activity unit profile, wherein the activity unit profile is a structured data set including at least the application identifier and the activity unit type; a trigger database of the processing server configured to store a trigger profile for each activity unit value of the one or more activity unit values, wherein each trigger profile is a structured data set including at least the application identifier and the respective activity unit value; and a transmitting device of the processing server configured to electronically transmit a data signal superimposed with a confirmation notification indicative of confirmation of storage of the trigger profile for each activity unit value to the computing device.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

System for Standardization of Wearable Device Activity and Content Distribution

Figure 1:
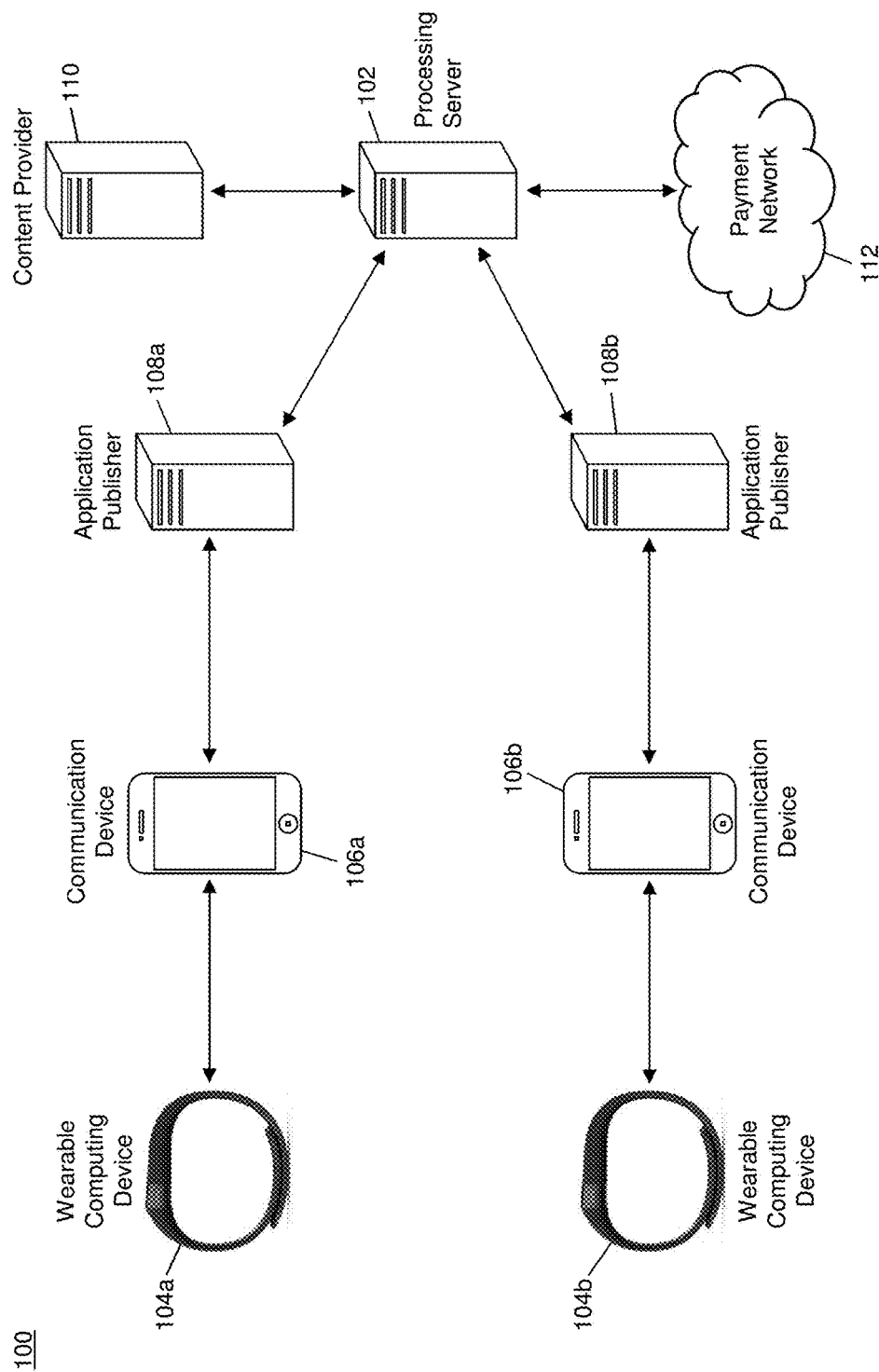
FIG. 1 is a block diagram illustrating a high level system architecture for the standardization of wearable device activity data and use thereof in content distribution and association of activity data with additional data sets in accordance with exemplary embodiments.

FIG. 1 illustrates a system 100 for the standardization of activity data of wearable computing devices for use in the distribution of content associated therewith in an automated fashion by computers that have been specifically programmed with executable code to achieve the functions disclosed herein that are not available on general purpose computers without requiring human intervention and at a scale of millions of data points and transactions wherein human processing of the data is not achievable in any realistic sense.

The system 100 may include a processing server 102. The processing server 102, discussed in more detail below, may be configured to standardize activity data for wearable computing devices 104, such as the wearable computing devices 104a and 104b illustrated in FIG. 1. Wearable computing devices 104 may be any type of computing device configured to be worn by an individual and used to track activity of the individual through the use of various sensors, generally including multiple accelerometers, magnetometers, geolocation sensors (GPS, WiFi or other triangulation devices, etc.), heat sensors, pulse detectors, pressure sensors, etc. and sensation generating devices, such as micro-electro-mechanical (MEM)-based speakers, vibration producing MEMs, electrodes, etc. Tracked activities may include physical activity, such as steps taken, distance traveled, calories burned, heart rate, steps or floors climbed, etc., or non-physical activity that may be performed by the individual via the wearable computing device, such as the sending or receiving of text or e-mail messages or phone calls, the playing of music, navigation to one or more locations, etc. Wearable computing devices 104 may include, for example, pedometers, global positioning system (GPS) transmitters, receivers, or transceivers, fitness trackers, heart rate monitors, smart watches, etc., and may also include implantable computing devices configured to perform the functions of wearable computing devices 104 discussed herein.

In the system 100, each wearable computing device 104 may be in communication with a communication device 106, illustrated in FIG. 1 as communication devices 106a and 106b. Communication devices 106 may be mobile communication devices suitable for performing the functions discussed herein, such as cellular phones, smart phones, smart watches, laptop computers, tablet computers, notebook computers, or the wearable computing devices 104 themselves, as well as desktop computers, smart televisions, and other suitable types of communication devices 106. Communication between the wearable computing device 104 and a communication device 106 may be performed using any suitable type of communication channel, such as near field communication, radio frequency, local area network, wide area network, wireless area network, Bluetooth, etc. The wearable computing device 104 and communication device 106 may establish a communication channel by which the wearable computing device 104 and communication device 106 can exchange data signals superimposed with data messages. The wearable computing device 104 may, for example, electronically transmit data signals to an associated communication device 106 using the communication channel that are superimposed with activity data tracked via the wearable computing device 104.

In many instances, a communication device 106 may be specially configured to communicate with a wearable computing device 104 and receive data electronically transmitted therefrom via an application program stored in a memory of the communication device 106 and executed by a processing device included therein. The application program may be provided to the communication device 106 by an application publisher 108. The application publisher 108 may be an entity that is associated with the wearable computing device 104 and authorized to publish the application program that is executed by the communication device 106 in order to communicate with the wearable computing device 104. In some instances, the application publisher 108 may be the manufacturer of the wearable computing device 104. In other instances, the application publisher 108 may be an entity operating on behalf of or at the request of the manufacturer of the wearable computing device 104 or other entity associated therewith.

The communication device 106 may be configured to electronically transmit activity data measured by the wearable computing device 104 and communicated to the communication device 106b to the application publisher 108 using one or more suitable communication networks. For example, the communication device 106 may electronically transmit the activity data to the application publisher 108 via superimposition on a data signal that is electronically communicated to the application publisher 108 using the Internet, a cellular communication network, a radio frequency network, a local area network, etc. In some instances, an application publisher may be configured to receive activity data associated with more than one wearable computing device 104 at a time, such as if the application program executed by the communication device 106 and associated with the application publisher 108 is configured to communicate with multiple wearable computing devices 104, such as receiving activity data from both a pedometer and a heart rate monitor.

As used herein, "application publisher" may refer to any entity configured to electronically receive activity data tracked using the wearable computing device 104 and electronically communicated to the application publisher 108 via the communication device 106, that is also configured to electronically transmit the activity data to the processing server 102. The activity data may be electronically transmitted by the application publisher 108 to the processing server 102 via any suitable communication network, such as the Internet, cellular communication network, radio frequency network, local area network, etc. The processing server 102 may then, using the methods and systems discussed herein, identify content for distribution to the communication device 106 based on the activity data.

In order to identify content, activity data received by the processing server 102 as tracked by wearable computing devices 104 may be standardized. The application publisher 108 may electronically transmit a data signal to the processing server 102 using a suitable communication network that is superimposed with registration data to register a trigger event. A trigger event may be an event that is triggered based on activity data measured by the wearable computing device 104 that triggers the distribution of content to the associated communication device 106, e.g., running 400 miles over time triggers content regarding the need for new running shoes, to name just one of the many possibilities. Trigger events may be standardized by the processing server 102 using the methods and systems discussed herein such that a content provider 110 may provide content for distribution to communication devices 106 without having to specify desired activity types and levels across each different type of wearable computing device, activity type, and application publisher 108.

The registration data submitted by the application publisher 108 may comprise at least an activity unit type, one or more activity unit values, and an application identifier. The activity unit type may be a type of activity and/or a unit of measurement associated therewith. For example, an activity unit type may include steps, stairs, floors, calories, miles, kilometers, feet, minutes, hours, laps, songs, books, articles, playlists, movies, videos, stations, checkpoints, locations, or any other type of activity that may be tracked via the wearable computing device 104. Each activity unit value may be a value for the associated activity unit type that is to serve as a trigger for the distribution of content to the associated communication device. For example, if the activity unit type is miles, the application publisher 108 may register a trigger event for each of 1, 3.1, 5, 6.2, 10, 13.1, and 26.2 miles. In some instances, an activity unit type may also include an associated unit of measurement. For example, the application publisher may register for a trigger event for 10,000 steps at a time. In such an instance, the activity unit values may be values indicating repetitions of the activity type and unit of measurement. For example, if the activity unit type is 10,000 steps, activity unit values may include 1, 2, 2.5, and 5, which may result in triggers when the individual has reached 10,000, 20,000, 25,000, and 50,000 steps, respectively. In some instances, the unit of measurement may be time-based, such as the measuring of activity of the associated activity unit type per day, per week, per month, per year, all time, etc. For example, an application publisher 108 may register for trigger events for 10,000, 20,000, and 50,000 steps per day, as well as trigger events for 250,000 and 500,000 steps per week and 10,000,000 and 100,000,000 lifetime steps.

In some embodiments, the application publisher 108 may also provide a standardized activity level to be associated with each activity unit value. The standardized activity level may be one of a plurality of preset (e.g., by the processing server 102) activity levels indicative of an intensity, length, or other level measurement of activity to be associated with the corresponding activity unit value. Standardized activity levels may include, for example, sedentary, low activity, mild activity, high activity, and intense activity. The application publisher 108 may select a standardized activity level to be associated with each activity unit value, such as selecting sedentary for 1,000 steps and high activity for 25,000 steps.

The application identifier may be an identification value unique to the associated application publisher, such as an identification number, registration number, serial number, alphanumeric code, internet protocol address, etc. The application identifier may be used to identify trigger events as registered by the associated application publisher 108 based on activity, such as in instances where there may be multiple application publishers 108 providing the same type of activity. For example, three different application publishers may register trigger events for walking activity measured by different types of wearable computing devices 104, with each one registering for a different activity unit type and/or activity unit value. For example, a first application publisher 108 may submit for triggers at 2,000, 5,000, and 10,000 steps, a second application publisher 108 may submit triggers for 10,000, 25,000, and 50,000 steps, and a third application publisher 108 may submit triggers for 10,000, 50,000, and 100,000 steps. In such an instance, the receipt of activity data by the processing server 102 may accompany an application identifier such that the processing server 102 can identify the appropriate trigger events. For example, activity data indicating that 5,000 steps was reached by an individual would not trigger an event for the second or third application publisher 108, but would for the first application publisher 108.

The processing server 102 may store the activity unit types and associated application identifiers in a framework database, which may provide a framework for future activity data submissions and trigger event submissions by the associated application publishers 108. The processing server 102 may also generate trigger event profiles for each trigger event registered by the application publisher 108. Each trigger event may include a single activity unit value submitted by the application publisher 108, such that if the submission includes multiple activity unit values (e.g., 1, 2, 5, and 10), then a trigger event profile may be generated and stored in the processing server 102 for each activity unit value. Each trigger event profile may also include the associated activity unit value and application identifier. In instances where a trigger event may be associated with a standardized activity level, the level may be stored or otherwise indicated in the associated trigger event profile.

In some instances, the processing server 102 may generate a unique identifier for each registered trigger event. The unique identifier, referred to herein as a "trigger identifier," may be a unique value that is associated with the corresponding trigger event used in the identification thereof. The trigger identifier may be, for example, an identification number, alphanumeric code, or other value that may be unique and suitable for use in identification using the methods and systems discussed herein. The trigger identifier may be stored in the corresponding trigger event profile.

Once the trigger event profiles have been generated and stored, the processing server 102 may electronically transmit a notification to the application publisher 108 using a suitable communication network that indicates that the trigger event registration was successful. In some embodiments, the processing server 102 may provide an application programming interface (API), which may be used by application publishers 108 in the submission of trigger event requests. In such embodiments, the application publisher 108 may access the API and submit the activity unit types and values, and any additional data (e.g., standardized activity levels) for faster, more efficient trigger event registration.

In the system 100, one or more content providers 100 may provide content to the processing server 102 for distribution to communication devices 106 based on activity measured by the wearable computing devices 104. Each content provider 100 may electronically transmit a data signal to the processing server 102 using a suitable communication network that is superimposed with a content submission. The content submission may include a content data file and may also include trigger data, which may indicate an activity type, value, and/or level, or may indicate a specific trigger event, which may indicate when the content data file is to be electronically transmitted to a communication device 106. The content data file may be an image, video, audio, executable, or other suitable type of file that may be received by the communication device 106 for the conveyance of content to the user thereof. The trigger data may include, for example, a trigger identifier for a specific trigger event (e.g., 10,000 steps indicated by a specific application publisher 108), an activity unit type and value (e.g., 10,000 steps) that may be triggered by multiple application publishers 108 (e.g., any that provides activity measurement of that same activity unit type), or a standardized activity level (e.g., mild activity) that may be triggered by multiple application publishers 108 and activity unit types (e.g., activating for mild activity in terms of both steps taken or calories burned as submitted by multiple application publishers 108).

In such instances, a content provider 110 may customize when they want their content to be provided to communication devices 108. For example, a content provider 110 may want to target a specific activity, such as floors climbed, regardless of the wearable computing device 104 used to measure the activity. In another example, a content provider 110 may have a partnership with an application publisher 108 for the distribution of content based on activity measured by a specific wearable computing device 104 and may want to target a specific activity only for that application publisher 108. For example, a content provider 110 and application publisher 108 may have a deal where content that comprises special offers for sporting goods items may be distributed to communication devices 106 when 250 floors are climbed by individuals as tracked using a specific wearable computing device 104 associated with that application publisher 108.

The processing server 102 may generate and store content profiles based on content submissions received from the content providers 110. Each content profile may include at least the received content data file and the associated trigger data. In some embodiments, the content submission may be submitted to the processing server 102 via an API. For example, each content provider 110 may use the API of the processing server 102 to submit content, which may result in a more efficient submission process via the API enhancing the ease of selection of activity unit types and values or trigger identifiers that correspond to previously registered trigger events.

The processing server 102 may receive activity notifications electronically transmitted to the processing server 102 by the application publisher 108 using a suitable communication network, and may identify content profiles associated therewith. Each activity notification may include at least the application identifier associated with the application publisher 108 submitting the notification and trigger data associated with activity that was tracked by a wearable computing device 104 and provided to the application publisher 108 via the communication device 106. The trigger data may include, for instance, a trigger identifier associated with a trigger event that was reached based on the activity data, or an activity unit type and activity unit value corresponding to a trigger event that was met based on the activity data. For example, the trigger data may include the identification number for the trigger event registered for 10,000 steps, or may include 10,000 steps as the trigger data.

The processing server 102 may receive the trigger data and may identify one or more content profiles based thereon. In instances where the trigger data provided in the activity notification does not include a trigger identifier, the processing server 102 may identify a trigger identifier that corresponds to the activity unit type and value included in the trigger data, by identification of a trigger event profile that includes the activity unit value and application identifier included in the activity data submission. The processing server 102 may then identify content profiles based on the included trigger data and the received activity data. In instances where a content profile's trigger data includes a trigger identifier, the processing server 102 may identify content profiles whose included trigger identifier corresponds to the trigger identifier received in the activity data submission or identified based thereon. In instances where a content profile's trigger data includes an activity unit type and value or standardized activity level, the processing server 102 may identify any content profiles whose activity unit type and value or standardized activity level correspond to those included in the received activity data notification or corresponding trigger event profile.

Once a content profile has been identified, the processing server 102 may electronically transmit the included content data file to the application publisher 108 using a suitable communication network. The application publisher 108 may then forward the content data file on to the communication device 106 associated with the wearable computing device 104 that measured the activity, for display or other type of conveyance to the user. In some embodiments, the processing server 102 may be configured to electronically transmit the content data file directly to the communication device 106 via a suitable communication network. In such embodiments, the activity data notification submitted by the application publisher 108 may include information suitable for identifying and/or communicating with the communication device 106. For instance, the activity data notification may include a phone number, e-mail address, media access control address, username, internet protocol address, etc. associated with the communication device 106 for use by the processing server 102 in directly communicating the content data file to the communication device 106.

The methods and systems discussed herein may enable for easier and more efficient distribution of content to communication devices 106 based on activity data measured using wearable communication devices 104 via the use of standardized trigger events based on the activity data. By standardizing activity data, application publishers 108 can provide activity data using their existing systems and be able to receive content in return without having to make modifications to accommodate content providers 110 and without having to make arrangements with each individual content provider 110 and provide activity data thereto. In addition, content providers 110 can provide content that is distributed based on specific criteria to a wide variety of communication devices 106 based on activity without having to communicate with each individual application publisher 108, and without having to receive activity data that is measured using different types and values. As a result, the methods and systems discussed herein may result in a simplified technological system that, via the processing server 102, provides for more efficient content distribution via the standardization of activity data and facilitation of communications between content providers 110 and application publishers 108.

In some embodiments, the processing server 102 may also be configured to pair activity data with one or more additional sources of data. In an exemplary embodiment, the processing server 102 may be configured to pair wearable computing device activity data with transaction data for electronic payment transactions. In such an embodiment, the system 100 may include a payment network 112. The payment network 112 may be configured to process electronic payment transactions using traditional methods and systems, such as using the process 1000 illustrated in FIG. 10 and discussed in more detail below. Following the processing of one or more payment transactions, the payment network 112 may be configured to electronically transmit transaction data to the processing server 102 using the payment rails or a suitable, alternative communication network. Transaction data may include data associated with a payment transaction, such as a transaction amount, transaction time, transaction data, primary account number, geographic location, consumer data, merchant data, offer data, reward data, loyalty data, point of sale data, product data, etc.

In some instances, the payment network 112 may be configured to provide the transaction data in transaction messages. Transaction messages may be specially formatted data messages conveyed using the payment rails that are formatted pursuant to one or more standards governing the exchange of financial transaction messages, such as the International Organization of Standardization's ISO 8583 standard. Transaction messages may include a plurality of data elements configured to store transaction data as set forth in the associated standard(s), such as data elements configured to store transaction amounts, transaction times, transaction dates, primary account numbers, geographic locations, consumer data, merchant data, offer data, reward data, loyalty data, point of sale data, product data, etc. Transaction messages may also include message type indicators indicative of a type of the transaction message, such as an authorization request. In such embodiments, the processing server 102 may be configured to parse the transaction data from the corresponding data elements of the transaction message. The processing server 102 may store the transaction data in a transaction database.

The processing server 102 may also store activity data associated with one or more communication devices 106 and/or wearable computing devices 104. As activity data notifications are received from the application publishers 108, the processing server 102 may store activity data associated therewith for a wearable computing device 104 and/or a communication device 106 in a corresponding activity profile in an activity database. The activity profile may thus include data related to the corresponding wearable computing device 104 or communication device 106, which may include tracked activity of one or more different activity unit types. For instance, an activity profile may include both steps taken and calories burned as measured by a wearable computing device 104 and, in some instances, may also include data measured by a second wearable computing device 104 associated with a same communication device 106, such as heart rate data captured via a heart rate monitor.

The processing server 102 may be configured to receive a data signal electronically transmitted by a third party entity that is superimposed with pairing data, for use in pairing activity data with transaction data. In some instances, the third party entity may be an application publisher 108 or a communication device 106. In other instances, the third party entity may be an additional entity not illustrated in FIG. 1, such as a credit bureau, data collection agency, research firm, or other entity that may be suitable for collecting the pairing data. Pairing data may include at least a device identifier associated with a wearable computing device 104 or communication device 106, as well as a primary account number associated with a transaction account that is associated with the wearable computing device 104 or communication device 106. Pairing data may be collected with the express consent of the individual associated therewith and may, in some instances, be directly submitted by the individual, such as in exchange for receiving more accurately targeted content. For example, the individual may input a primary account number for pairing into a communication device 106, which may forward the primary account number as well as a device identifier associated with the communication device 106 to the processing server 102 for pairing. The device identifier may be a unique value associated with a wearable computing device 104 or communication device 106 for identification thereof, such as an identification number, registration number, serial number, media access control address, internet protocol address, username, e-mail address, telephone number, etc.

The processing server 102 may receive the pairing data and may then pair transaction data associated therewith with activity data associated therewith. The processing server 102 may identify transaction data related to payment transactions where the included primary account number matches the primary account number in the pairing data, and may store that transaction data in an activity profile where the included device identifier matches the device identifier in the pairing data. Once the transaction data has been paired to the activity data, the transaction data may be used in the distribution of content to the communication device 106 associated therewith. For example, the processing server 102 may be configured to calculate transaction behaviors based on the transaction data. Transaction behaviors may include metrics that measure propensities or other behaviors for the associated transaction account based on the transaction data. Transaction behaviors may include, for example, average ticket size, transaction frequency, geographic location, location preferences, merchant preferences, product and/or manufacturer preferences, propensities to spend a specific amount, purchase at a specific merchant or type of merchant, purchase at a specific time and/or date, purchase a specific product or type of product, etc.

The transaction behaviors may be used in the identification of content to be distributed to the associated communication device 106. For example, a content provider 110 may submit multiple content items with the same trigger data, where each content item is further associated with one or more transaction behaviors. In such an instance, when an activity notification is received that corresponds to a trigger event for which the multiple content items apply, the processing server 102 may identify one of the content items where the associated transaction behaviors most closely match the transaction behaviors for the communication device 106 to receive the content. For example, a content provider 110 may be a retailer and may submit three separate product offers as content submissions, where each is associated with 25,000 steps in a day as the trigger event. The three product offers may each be associated with different transaction behaviors, such as an offer for workout clothing associated with a high propensity for clothing purchases, an offer for an audio player associated with a high propensity for electronic purchases, and an offer for a smoothie associated with a low propensity to spend above ten dollars. When an activity notification is received that indicates that an individual triggered the 25,000 step event, the processing server 102 may identify the transaction behaviors paired to the corresponding wearable computing device 104 or communication device 106 and identify which of the three product offers to provide based on the paired transaction behaviors. For instance, if the transaction account indicates a high propensity to spend on electronics and to spend above ten dollars, and a low propensity for clothing, the product offer for an audio player may be distributed to the communication device 106.

By pairing transaction data to activity data, content distributed to communication devices 106 based on wearable computing device 104 activity data can be further targeted, which may provide for higher rates of return and conversion rates for distributed content. When combined with the systems discussed herein for standardizing activity data, this may enable content providers 110 to distribute content that is targeted to not only an individual's activity, but also their spending habits, to provide for content that is more closely aligned to an individual's interests, such that content providers 110 receive higher conversion rates and individuals receive content that they are more likely to appreciate.

Processing Server

Figure 2:
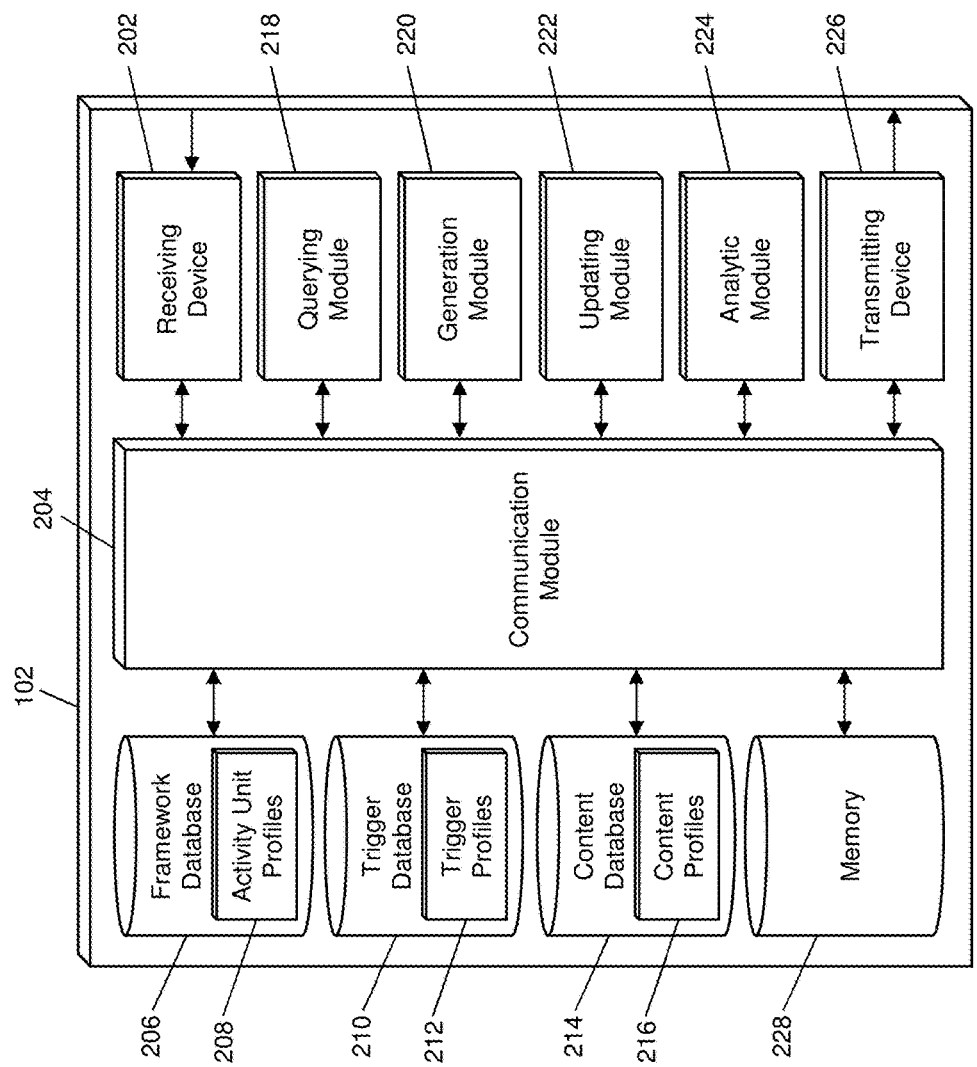
FIG. 2 is a block diagram illustrating the processing server of FIG. 1 for the standardization of wearable device activity data, pairing of wearable device activity data, and distribution of content in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 1100 illustrated in FIG. 11 and discussed in more detail below may be a suitable configuration of the processing server 102.

The processing server 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 112 for the transmission of transaction messages that include sensitive financial data and information. In some instances, the receiving device 202 may also be configured to receive data from wearable computing devices 104, communication devices 106, application publishers 108, content providers 110, payment networks 112, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive electronically data signals that are transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by application publishers that are superimposed with trigger event submissions and activity data notifications. Trigger event submissions may include application identifiers and trigger data suitable for use in the generation of trigger events for use in distributing content to communication devices 106 based on activity data. Activity data notifications may include notifications of activity measured by a wearable computing device 104 and may include an application identifier and a trigger identifier or activity unit type and value. In some instances, activity data notifications may be received directly from communication devices 106 and/or wearable computing devices 104. The receiving device 202 may also be configured to receive data signals from content providers 110 superimposed with content submissions, which may include content data files and trigger data. In some embodiments, the receiving device 202 may also be configured to receive data signals superimposed with pairing requests, such as from an application publisher 108, communication device 106, or another entity, which may include a device identifier associated with a wearable computing device 104 or communication module 106 and a primary account number associated with a transaction account. In such embodiments, the receiving device 202 may also receive transaction data from payment networks 112, which may be comprised in transaction messages electronically transmitted via the payment rails.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 2220, updating module 222, analytic module 224, etc. As used herein, the term "module" may be software or hardware particularly programmed to receive an input, perform one or more processes using the input, and provide an output. The input, output, and processes performed by various modules will be apparent to one skilled in the art based upon the present disclosure.

The processing server 102 may include a framework database 206. The framework database 206 may be configured to store a plurality of activity unit profiles 208 using a suitable data storage format and schema. The framework database 206 may be a relational database that utilizes structured query language for the storage, identification, modifying, updating, accessing, etc. of structured data sets stored therein. Each activity unit profile 208 may be a structured data set configured to store data associated with an activity unit registered by an application publisher 108 for use in trigger events. As discussed in more detail below, each activity unit profile 208 may include at least an activity unit type and an application identifier.

The processing server 102 may also include a trigger database 210. The trigger database 210 may be configured to store a plurality of trigger profiles 212 using a suitable data storage format and schema. The trigger database 210 may be a relational database that utilizes structured query language for the storage, identification, modifying, updating, accessing, etc. of structured data sets stored therein. Each trigger profile 212 may be a structured data set configured to store data associated with a trigger event registered by an application publisher 108 that is to trigger the distribution of content to a wearable computing device 104 based on activity data measured thereby. As discussed in more detail below, each trigger profile 212 may include at least an activity unit value and an application identifier. In some instances, a trigger profile 212 may also include an activity unit type, a standardized activity value, and/or a trigger identifier.

The processing server 102 may further include a content database 214. The content database 214 may be configured to store a plurality of content profiles 216 using a suitable data storage format and schema. The content database 214 may be a relational database that utilizes structured query language for the storage, identification, modifying, updating, accessing, etc. of structured data sets stored therein. Each content profile 216 may be a structured data set configured to store data associated with content to be distributed to a communication device 106 based on activity data measured by a wearable computing device 104. As discussed in more detail below, each content profile 216 may include at least a content item and trigger data. In some instances, a content profile 216 may also include one or more transaction behaviors.

In some embodiments, the processing server 102 may also include data suitable for use in the pairing of transaction data to activity data, which may be stored in an activity database and a transaction database (not illustrated). The activity and transaction databases may be configured to store data using a suitable data storage format and schema and may be relational databases that utilize structured query language for the storage, identification, modifying, updating, accessing, etc. of structured data sets stored therein. The activity database may be configured to store a plurality of activity profiles, which, as discussed in more detail below, may be structured data sets configured to store data related to a wearable computing device 104 or communication device 106 including at least a device identifier and activity data. The transaction database may be configured to store a plurality of transaction data entries, which, as discussed in more detail below, may be structured data sets configured to store data related to a payment transaction including at least a primary account number and additional transaction data. In instances where an activity profile has been paired to transaction data, associated transaction data entries may be stored in the activity profile.

The processing server 102 may include a querying module 218. The querying module 218 may be configured to execute queries on databases to identify information. The querying module 218 may receive one or more data values or query strings, and may execute a query string based thereon on an indicated database, such as the framework database 206, trigger database 210, content database 214, account database, and transaction database, to identify information stored therein. The querying module 218 may then output the identified information to an appropriate engine or module of the processing server 102 as necessary. The querying module 218 may, for example, execute a query on the trigger database 210 to identify a trigger profile 212 related to a triggered activity as indicated in a received activity data notification. The querying module 218 may also be configured to execute queries to store, modify, update, delete, or otherwise manage data stored in the databases of the processing server 102, such as a query configured to store a newly generated trigger profile 212 in the trigger database 210.

The processing server 102 may further include a generation module 220. The generation module 220 may be configured to generate data for use in performing the functions of the processing server 102 as discussed herein. The generation module 220 may receive one or more instructions for the generation of data, may generate the requested data, and may output the requested data to another module or engine of the processing server 102 for further action. In some instances, the generation module 220 may also receive data as input, for use in performing the requested functions. For example, the generation module 220 may be configured to generate a trigger profile 212 for a newly requested trigger event and, if applicable, a new activity unit profile 208. In some instances, the generation of a trigger profile 212 may include the generation of a trigger identifier for inclusion therein. In some cases, the generation module 220 may generate a trigger identifier using a random or pseudo-random number generation algorithm. The generation module 220 may then output the generated trigger profile 212 to the querying module 218 for storage in the trigger database 210.

The processing server 102 may also include an updating module 222. The updating module 222 may be configured to update data stored in the databases of the processing server 102 based on actions performed by the various engines or modules of the processing server 102, as well as based on data received by the receiving device 202. The updating module 222 may receive data to be used to update the databases in the processing server 102, may perform any requisite calculations or analysis, and may create a query for execution by the querying module 218 to update the associated database(s). For example, the updating module 222 may be configured to update the activity data stored in an activity profile of the activity database upon receipt of an activity data notification by the receiving device 202. In another example, the updating module 222 may be configured to update a trigger profile 212 based on newly received data, such as a modification to the activity unit value or addition or modification of a standardized activity value.

In some embodiments, the processing server 102 may further include an analytic module 224. The analytic module 224 may be configured to perform analysis of transaction data stored in the transaction data entries of the transaction database for use in the distribution of content to communication devices 106. The analytic module 224 may receive transaction data as input, and may, in some instances, also receive one or more requested metrics or transaction behaviors, may analyze the transaction data to calculate or otherwise identify one or more metrics or transaction behaviors (e.g., those requested), and may output the transaction behaviors to another module or engine of the processing server 102 for use thereby. For instance, transaction behaviors may be output to the querying module 218 for inclusion in a corresponding activity profile or for use in identifying a content profile 216 for the distribution of content.

The processing server 102 may also include a transmitting device 226. The transmitting device 226 may be configured to transmit data over one or more networks via one or more network protocols. In some embodiments, the transmitting device 226 may be configured to transmit data over the payment rails, such as using specially configured infrastructure associated with payment networks 112 for the transmission of transaction messages that include sensitive financial data and information, such as identified payment credentials. In some instances, the transmitting device 222 may be configured to transmit data to wearable computing devices 104, communication devices 106, application publishers 108, content providers 110, payment networks 112, and other entities via alternative networks, such as the Internet. In some embodiments, the transmitting device 226 may be comprised of multiple devices, such as different transmitting devices for transmitting data over different networks, such as a first transmitting device for transmitting data over the payment rails and a second transmitting device for transmitting data over the Internet. The transmitting device 226 may electronically transmit data signals that have data superimposed that may be parsed by a receiving computing device. In some instances, the transmitting device 226 may include one or more modules for superimposing, encoding, or otherwise formatting data into data signals suitable for transmission.

The transmitting device 226 may be configured to electronically transmit data signals to application publishers 108 and content providers 110 that are superimposed with notifications, such as to notify the entities of successful or unsuccessful registration of trigger events and content submissions. The transmitting device 226 may also be configured to electronically transmit data signals that are superimposed with content data files, such as may be electronically transmitted to the application publisher 108 in response to an activity data notification or directly to a communication device 106 based on associated wearable computing device 104 activity. The transmitting device 226 may also be configured to transmit data signals superimposed with requests for data, such as with a request for transaction data to the payment network 112, a request for content to a content provider 110, a request for standardized activity values to an application publisher 108, and other requests suitable for performing the functions of the processing server 102 as discussed herein.

The processing server 102 may also include a memory 228. The memory 228 may be configured to store data for use by the processing server 102 in performing the functions discussed herein. The memory 228 may be configured to store data using suitable data formatting methods and schema and may be any suitable type of memory, such as read-only memory, random access memory, etc. The memory 228 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art.

Data Relationships

Figure 3:
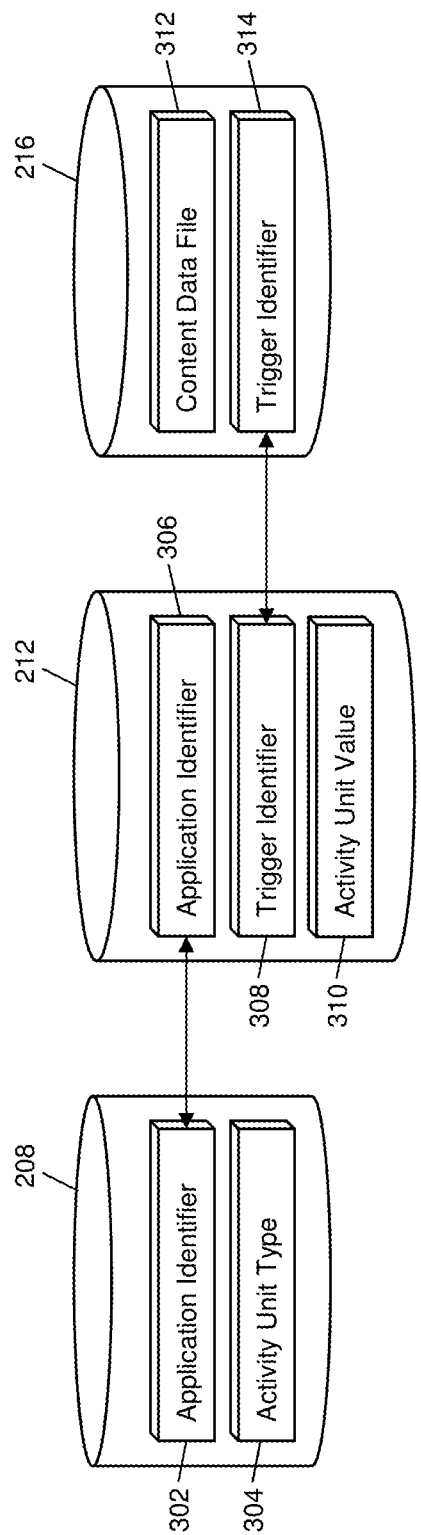
FIG. 3 is a block diagram illustrating data relationships in data stored in the databases of the processing server of FIG. 2 for storing standardized wearable device activity data and trigger data in accordance with exemplary embodiments.

FIG. 3 illustrates relationships between data stored in the framework database 206, trigger database 210, and content database 214 of the processing server 102 for use in performing the functions of the processing server 102 discussed herein.

As illustrated in FIG. 3, each activity unit profile 208 in the framework database 206 may be configured to store at least an application identifier 302 and an activity unit type 304. The application identifier 302 may be a unique value associated with an application publisher 108 for use in identification thereof. The application identifier 302 may be, for example, an identification number, registration number, alphanumeric code, internet protocol address, etc. The application identifier 302 included in an activity unit profile 208 may be associated with the application publisher 108 that registered the activity unit profile 208 for use in trigger events associated therewith. The activity unit type 304 may be a type of activity measured by an associated wearable computing device 104 for which events are to be triggered, such as steps, floors, calories, miles, kilometers, feet, minutes, hours, laps, songs, books, articles, playlists, movies, videos, stations, checkpoints, locations, etc. In some instances, an activity unit type 304 may also include one or more units of measurement, such as a time measurement (e.g., hour, week, day, month, year, lifetime, etc.) and a measurement associated with the activity type (e.g., 10,000 steps, 100 calories, 15 minutes, etc.).

As also illustrated in FIG. 3, each trigger profile 212 in the trigger database 210 may be configured to store at least an application identifier 306, a trigger identifier 308, and an activity value 310. In some embodiments, a trigger profile 212 may also include a standardized activity value, which may be one of a preset plurality of standardized activity values. The application identifier 306 may be associated with the application publisher 108 that registered the respective event trigger. The trigger identifier 308 may be a unique value associated with the specific trigger profile 212 for use in identification thereof. The trigger identifier 308 may be, for example, an identification number, alphanumeric code, or other suitable value. The activity value 310 may be a value to be met by activity measured by a wearable computing device 104 to trigger the respective trigger event. In instances where the trigger profile 212 includes an activity unit type, the activity value 310 may be a value of that type of activity.

In other instances, the type of activity may correspond to an activity unit type 304 stored in an activity unit profile 208 where the application identifier 302 matches the application identifier 306 in the trigger profile 212, such as illustrated in FIG. 3. In such an instance, the querying module 218 may execute a query on the framework database 206 to identify the activity unit profile 208 that includes the application identifier 302 to match the application identifier 306. It will be apparent to persons having skill in the relevant art that the use of an application identifier 302 without additional data may only be suitable in cases where an application publisher 108 is associated with a single activity unit profile 208. In instances where an application publisher 108 is associated with multiple types of activities (e.g., and thus multiple activity unit profiles 208 having the same application identifier 302), each trigger profile 212 that includes the associated application identifier 306 may also include the corresponding activity unit type 304 for that respective trigger event.

As illustrated in FIG. 3, content profiles 216 stored in the content database 214 may each include at least a content data file 312 and a trigger identifier 314. The content data file 312 may be a data file configured to store content for distribution to a communication device 106 following a trigger event. The content data file 312 may be an image file, an audio file, a video file, an executable file, or any other file type that may be suitable for use in distribution to a communication device 106. The trigger identifier 314 may correspond to the trigger identifier 308 in a trigger profile 212 where, when the trigger event occurs, the content data file 312 is electronically transmitted to the communication device 106 where the activity that triggered the event was measured (e.g., using the wearable computing device 104). In some embodiments, a content profile 216 may store other trigger data in place of the trigger identifier 314, which may comprise a standardized activity level or an activity unit type 304 and activity unit value 310. In such embodiments, the content data file 312 may be provided to a communication device 106 upon triggering of the event based on the activity measured by the wearable computing device 104 without regard to a specific application publisher 108.

Figure 4:
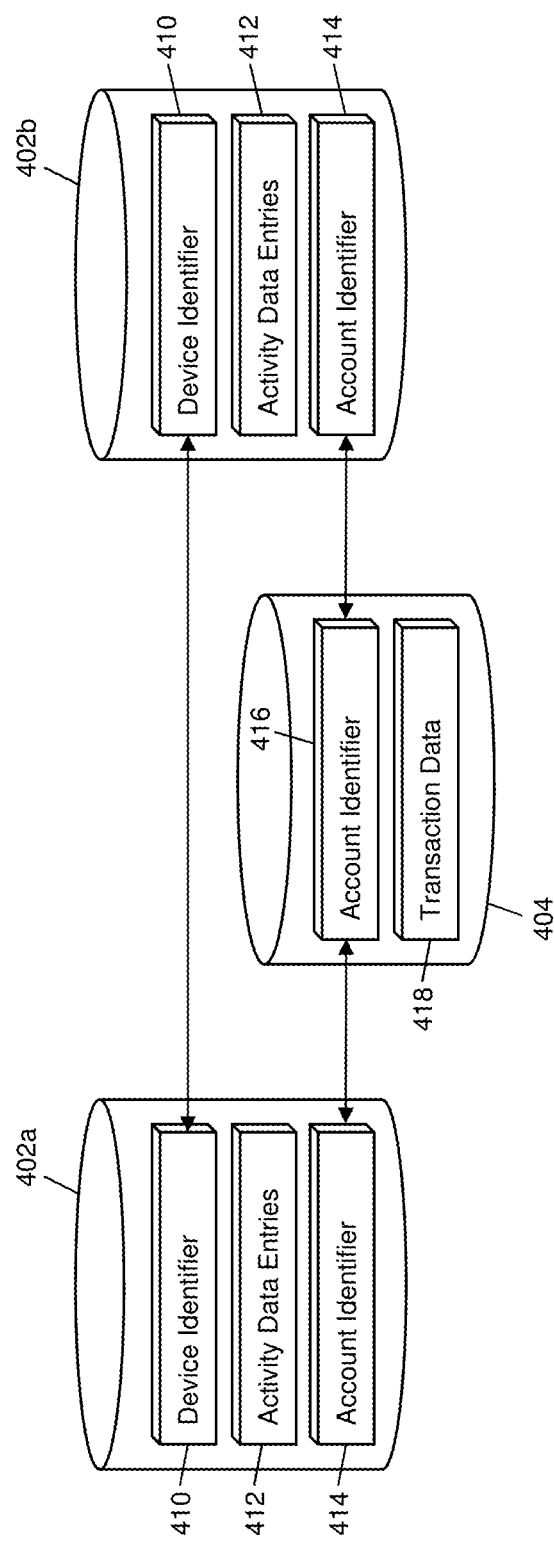
FIG. 4 is a block diagram illustrating data relationships in data stored in the databases of the processing server of FIG. 2 for pairing wearable device activity data and additional data sets in accordance with exemplary embodiments.

FIG. 4 illustrates relationships between data stored in the transaction database and activity database of the processing server 102 for use in the pairing of transaction data to wearable computing device 104 activity data, which may be used in the distribution of content to a communication device 106 based on wearable computing device 104 activity.

As illustrated in FIG. 4, each activity profile 402 may include at least a device identifier 410, one or more activity data entries 412, and an account identifier 414. The device identifier 410 may be an identification value associated with a wearable computing device 104 and/or communication device 106, which may include an identification number, registration number, serial number, media access control address, internet protocol address, telephone number, username, e-mail address, etc. The activity data entries 412 may correspond to activity data notifications received from the application publisher 108 associated with the device that corresponds to the device identifier 410 in the activity profile 402. Each activity data entry 412 may include, for example, an activity unit type and activity unit value, and may also include an application identifier, time, date, or any other information that may be suitable for use in the identification and distribution of content as discussed herein. The account identifier 414 may be a primary account number associated with a transaction account that has been paired to the respective activity profile 402 using the methods and systems discussed herein.

In some embodiments, multiple activity profiles 402 may be paired together. In such an embodiment, two or more activity profiles 402 may include the same device identifier 410 and/or account identifier 414, such as illustrated in FIG. 4. For example, a single individual may have two different devices for which their activity is measured, both of which may be paired to a single transaction account. In another example, a single individual may have a single wearable computing device for which their activity is measured, which may be paired to two different transaction accounts they use. In either instance, the common device identifier 410 and/or account identifier 414 included in the activity profile 402 may be used for pairing such that the activity data entries 412 included therein and associated transaction data may be shared for content identification and distribution.

As illustrated in FIG. 4, a transaction data entry 404 may include at least an account identifier 416 and transaction data 418. The account identifier 416 may be a primary account number used to fund the related payment transaction. In instances where an activity profile 402 has been paired to transaction data, the account identifier 416 in one or more transaction data entries 404 may correspond to the account identifier 414 in one or more paired activity profiles 402. The transaction data 418 may include data associated with the related payment transaction, such as a transaction amount, transaction time, transaction data, geographic location, consumer data, product data, merchant data, offer data, reward data, loyalty data, etc. In some instances, each transaction data entry 404 may be a transaction message, where the account identifier 416 may be stored in a corresponding data element configured to store a primary account number, and where the transaction data 418 may be stored across one or more data elements as set forth in the associated standard(s).

Process for Registering Standardized Activity Trigger Events

Figure 5:
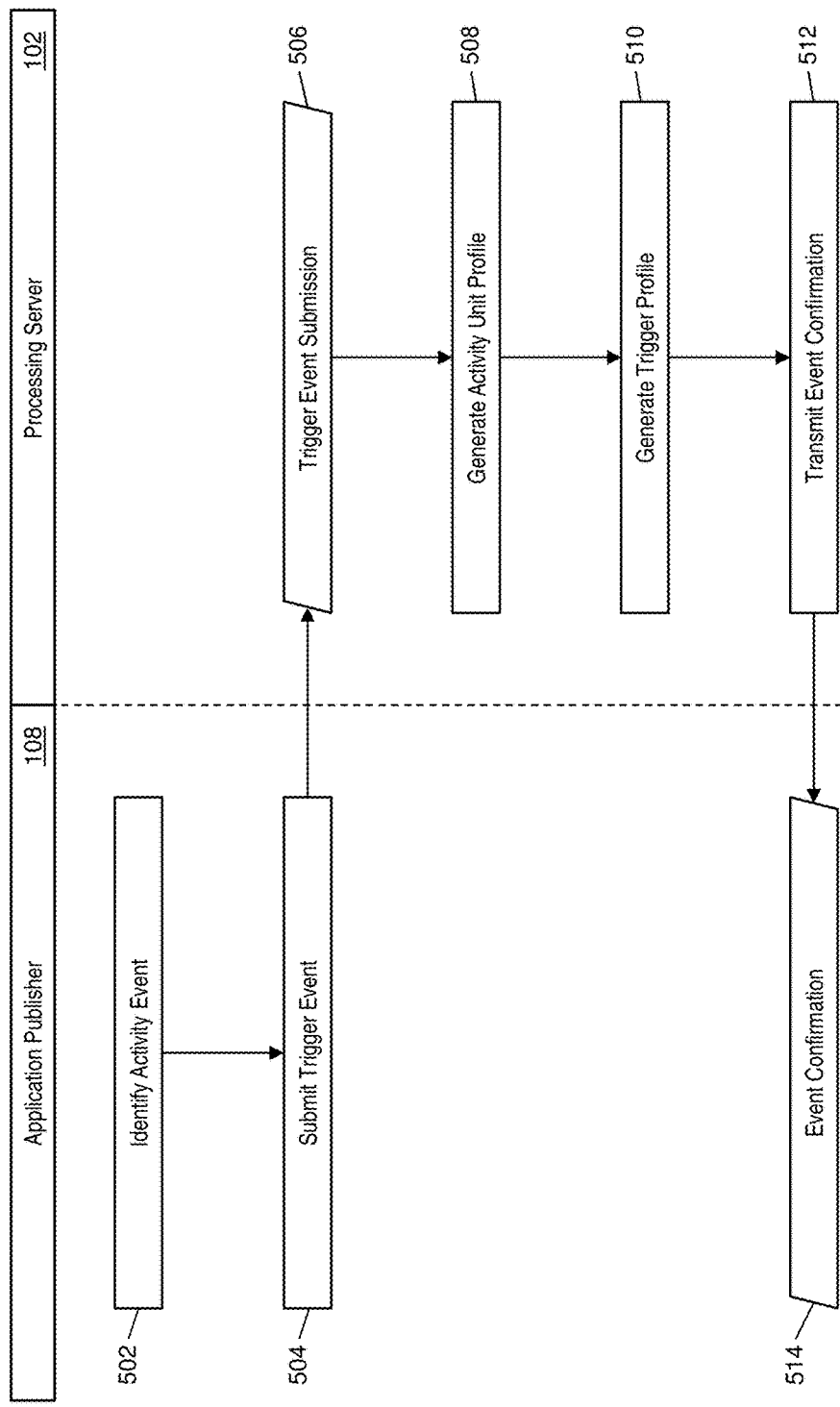
FIG. 5 is a flow diagram illustrating a process for standardizing wearable computing device activity data for use in trigger events for content distribution in accordance with exemplary embodiments.

FIG. 5 illustrates a process for the standardization of wearable computing device 104 activity data in the form of trigger events used to trigger the distribution of content to communication devices 106.

In step 502, the application publisher 108 associated with a wearable computing device 104 may identify an activity event. The activity event may be any event based on the measurement of activity via a wearable computing device 104 for which the application publisher 108 is configured to receive activity (e.g., directly or via a communication device 106). For example, if the application publisher 108 is measuring activity using a pedometer as the wearable computing device 104, the activity event may be 10,000 steps, 20,000 steps, etc. In another example, if the application publisher 108 is measuring activity using a smart watch that is configured to play music as the wearable computing device 104, the activity event may be the playing of 10 songs, 25 songs, 50 songs, etc.

In step 504, the application publisher 108 may electronically transmit a data signal to the processing server 102 using a suitable communication network that is superimposed with a trigger event submission. The trigger event submission may include at least an application identifier associated with the application publisher 108, an activity unit type for the activity being measured, and one or more activity values, each of which corresponds to an identified activity event. In some instances, the activity unit type may include one or more units of measurement, such as a time measurement. For example, the application publisher 108 may be registering for an event trigger for certain numbers of steps per day and/or steps per week.

In step 506, the receiving device 202 of the processing server 102 may receive the trigger event submission from the application publisher 108. In step 508, the generation module 220 of the processing server 102 may generate an activity unit profile 208 that serves as a framework for the activity type measured by the wearable computing device 104 associated with the application publisher 108, which may be stored in the framework database 206 via a query executed by the querying module 218. The activity unit profile 208 may include at least the application identifier and activity unit type included in the trigger event submission. In step 510, the generation module 220 may generate a trigger profile 212 for each activity unit value included in the trigger event submission. The trigger profile(s) 212 may include at least the application identifier and respective activity unit value, and may also include the activity unit type. The generation module 220 may also generate a trigger identifier for inclusion in each trigger profile 212. The generated trigger profile(s) 212 may be stored in the trigger database 210 via execution of a query by the querying module 218.

In step 512, the transmitting device 226 of the processing server 102 may electronically transmit a data signal superimposed with a confirmation to the application publisher 108 via a suitable communication network. The confirmation may indicate confirmation of the generation of the trigger profile(s) and, in some instances, may also include the associated trigger identifiers. In step 514, the application publisher 108 may receive the event confirmation. The application publisher 108 may then proceed to providing activity data notifications for the generated trigger event(s) to the processing server 102 upon measurement of the respective activity via the wearable computing device 104.

Process for Distributing Content Based on Wearable Computing Device Activity

Figure 6:
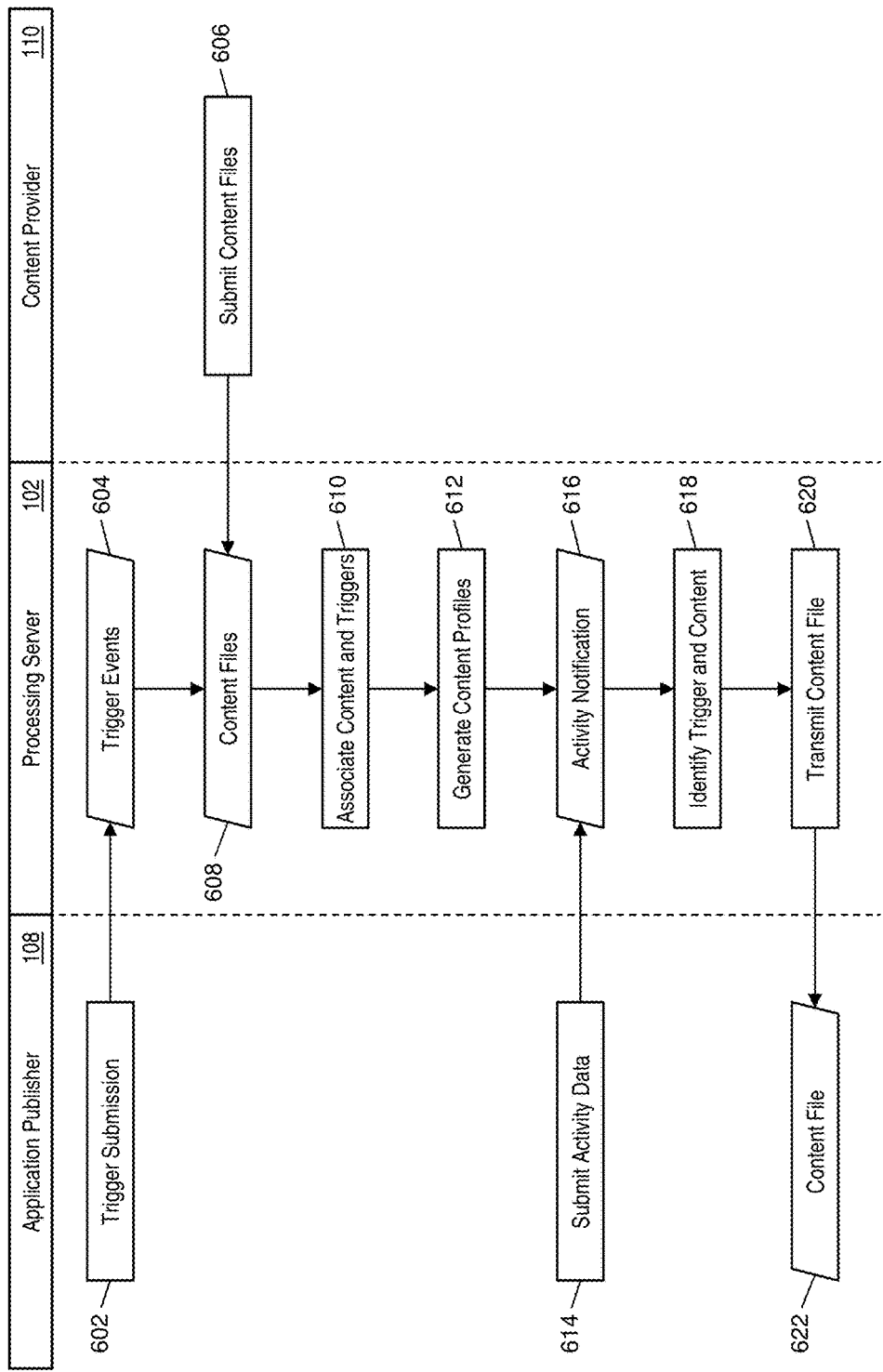
FIG. 6 is a flow diagram illustrating a process for the distribution of content based on triggered wearable device activity data in accordance with exemplary embodiments.

FIG. 6 illustrates a process 500 for the distribution of content to a communication device 106 based on activity measured via a wearable computing device 104 using standardized activity event triggers, such as those registered with the processing server 102 using the process illustrated in FIG. 5 and discussed above.

In step 602, the application publisher 108 may electronically transmit a trigger event submission to the processing server 102 via a suitable communication network, where the trigger event submission includes the application identifier associated with the application publisher 108, an activity unit type, and one or more activity unit values. In step 604, the processing server 102 may receive (e.g., via the receiving device 202) the trigger event submission and may generate and store trigger event profiles 212 for the trigger events, such as using the process illustrated in FIG. 5 and discussed above.

In step 606, the content provider 110 may electronically transmit one or more content submissions to the processing server 102 via a suitable communication network. Each content submission may include a content data file and associated trigger data. The associated trigger data may include a trigger identifier, standardized activity value, or an activity unit type and activity unit value, for which the associated content data file is to be transmitted to a communication device 106 upon triggering thereof. In step 608, the receiving device 202 of the processing server 102 may receive the content submissions.

In step 610, each content submission may be associated with one or more trigger events. The association of a content submission with a trigger event may include the execution of a query by the querying module 218 of the processing server 102 on the trigger database 210 to identify one or more trigger profiles 212 where the data included therein corresponds to the trigger data associated with the respective content data file. The association may include the identification of trigger identifiers included in the identified trigger profiles 212 for association with the respective content data files. It will be apparent to persons having skill in the relevant art that step 610 may be an optional step, such as in instances where a content data file is not directly associated with any specific trigger event, such as if a content data file is to be provided upon the triggering of an event based on an activity without direct association to a specific wearable computing device 104 or application publisher 108.

In step 612, the generation module 220 of the processing server 102 may generate a content profile 216 for each content item included in the content submissions electronically communicated by the content provider 110. Each content profile 216 may include the respective content data file and associated trigger data. In instances where trigger profiles 212 were identified for each content data file, the associated trigger data may be replaced and/or supplemented by the identified associated trigger identifiers.

In step 614, the application publisher 108 may electronically transmit an activity data notification to the processing server 102 using a suitable communication network. The activity data notification may include at least the application identifier associated with the application publisher 108 and a trigger identifier or an activity unit value based on activity measured via a wearable computing device 104 and received therefrom or via a communication device 106 in communication therewith. In some instances, an activity unit type may be included along with an activity unit value, such as instances where an application publisher 108 may measure more than one type of activity. In step 616, the receiving device 202 of the processing server 102 may receive the activity data notification.

In step 618, the processing server 102 may identify event triggers that are triggered by the measured activity and may identify content associated therewith for distribution. The identification of event triggers may include the execution of a query by the querying module 218 of the processing server 102 to identify a trigger profile 212 that includes the trigger identifier included in the activity data notification, or that includes the application identifier and activity unit value included in the activity data notification, and the activity unit type, if applicable, based on the data included in the activity data notification. The identification of content may include the execution of a query by the querying module 218 on the content database 214 to identify one or more content profiles 216 where the included trigger data corresponds to the data included in the identified trigger profile 212. In instances where more than one content profile 216 may be identified, the analytic module 224 or another suitable module or engine of the processing server 102 may select a single content profile 216 for provisioning, such as based on random selection, a priority order, or other suitable selection method. In instances where pairing of activity data and transaction data may be used, the querying module 218 may execute a query on the activity database to identify an activity profile that includes a device identifier included in the activity data notification and the analytic module 224 may identify transaction behaviors for the activity profile based on transaction data included therein (or stored in the transaction database and identified via the included primary account number), which may be used in the selection of the content profile 216.

In step 620, the transmitting device 226 of the processing server 102 may electronically transmit a data signal superimposed with the content data file included in the selected content profile 216 to the application publisher 108. In step 622, the application publisher 108 may receive the content data file, which may be forwarded on to the communication device 106 and/or wearable computing device 104 used to measure the activity.

Figure 7:
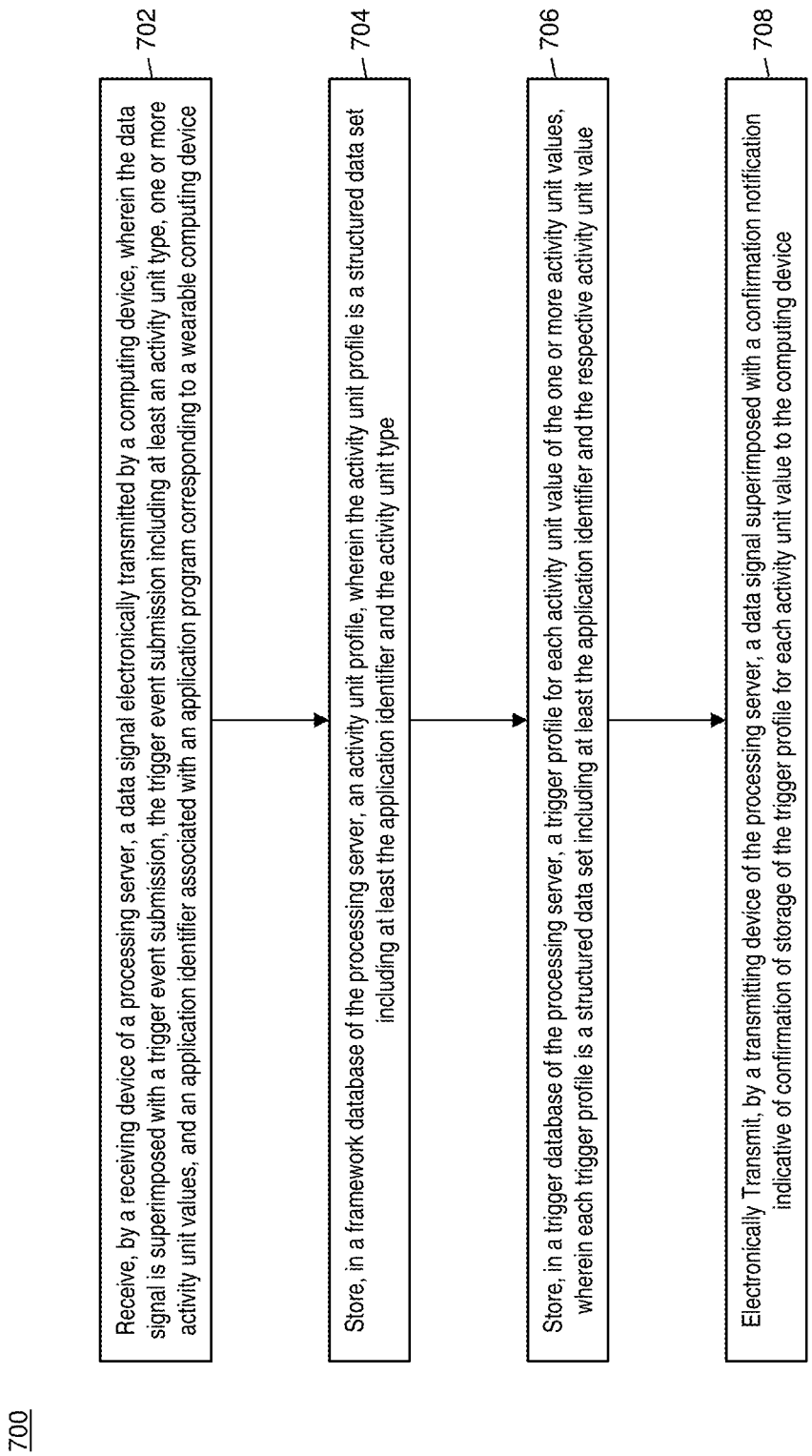
FIG. 7 is a flow chart illustrating an exemplary method for establishing trigger events for wearable computing device activity in accordance with exemplary embodiments.

Exemplary Method for Establishing Trigger Events for Wearable Computing Device Activity FIG. 7 illustrates a method 700 for the establishing of standardized trigger events corresponding to activity measured via a wearable computing device.

In step 702, a data signal electronically transmitted by a computing device (e.g., the communication device 106, which may transmit via the application publisher 108) may be received by a receiving device (e.g., the receiving device 202) of a processing server (e.g., the processing server 102), wherein the data signal is superimposed with a trigger event submission, the trigger event submission including at least an activity unit type, one or more activity unit values, and an application identifier associated with an application program corresponding to a wearable computing device (e.g., wearable computing device 104). In step 704, an activity unit profile (e.g., activity unit profile 208) may be stored in a framework database (e.g., framework database 206) of the processing server, wherein the activity unit profile is a structured data set including at least the application identifier and the activity unit type.

In step 706, a trigger profile (e.g., trigger profile 212) may be stored in a trigger database (e.g., the trigger database 212) of the processing server for each activity unit value of the one or more activity unit values, wherein each trigger profile is a structured data set including at least the application identifier and the respective activity unit value. In step 708, a data signal superimposed with a confirmation notification indicative of confirmation of storage of the trigger profile for each activity unit value may be electronically transmitted by a transmitting device (e.g., the transmitting device 226) of the processing server to the computing device.

In one embodiment, each trigger profile may further include a unique trigger identifier. In a further embodiment, the method 700 may also include: receiving, by the receiving device of the processing server, a data signal superimposed with an activity notification, wherein the activity notification includes at least a specific activity unit value associated with activity corresponding to a wearable computing device and a specific application identifier; executing, by a querying module (e.g., the querying module 218) of the processing server, a query on the trigger database to identify a specific trigger profile where the included application identifier and activity unit value correspond to the specific activity unit value and specific application identifier included in the activity notification, respectively; and electronically transmitting, by the transmitting device of the processing server, a data signal superimposed with at least the unique trigger identifier included in the identified specific trigger profile.

In some embodiments, the method 700 may further include: storing, in the framework database of the processing server, a plurality of activity unit profiles, wherein each activity unit profile is a structured data set including one of a plurality of application identifiers and one of a plurality of activity unit types; and storing, in the trigger database of the processing server, a plurality of trigger profiles, wherein each trigger profile is a structured data set that includes one of the plurality of application identifiers and an activity unit value. In further embodiments, each trigger profile of the plurality of trigger profiles and the trigger profile for each activity unit value of the one or more activity unit values may include a unique trigger identifier, and the method may further comprise: receiving, by the receiving device of the processing server, a data signal superimposed with a content submission, wherein the content submission includes at least a content data file, a specific activity unit type, and a specific activity unit value; executing, by the querying module of the processing server, a query on the framework database to identify one or more specific activity unit profiles where the included activity unit type corresponds to the specific activity unit type; executing, by the querying module of the processing server, a query on the trigger database to identify one or more specific trigger profiles where the included application identifier corresponds to the application identifier included in one of the one or more identified specific activity unit profiles and the unit activity value corresponds to the specific activity unit value; and storing, in a content database (e.g., the content database 214) of the processing server, a content profile (e.g., content profile 216), wherein the content profile includes a structured data set including at least the content data file and the unique trigger identifier included in each of the identified one or more specific trigger profiles. In an even further embodiment, the content data file may be at least one of: an image file, an audio file, a video file, and an executable file.

In one embodiment, the activity unit type may be one of: steps, stairs, floors, calories, miles, kilometers, feet, minutes, hours, laps, songs, books, articles, playlists, movies, videos, stations, checkpoints, and locations. In some embodiments, the activity unit value may be an integer. In one embodiment, the activity unit type may be a combined measurement unit and value. In some embodiments, the data signal may be received via an application programming interface associated with the processing server.

Exemplary Method for Distributing Content to a Mobile Communication Device

Figure 8:
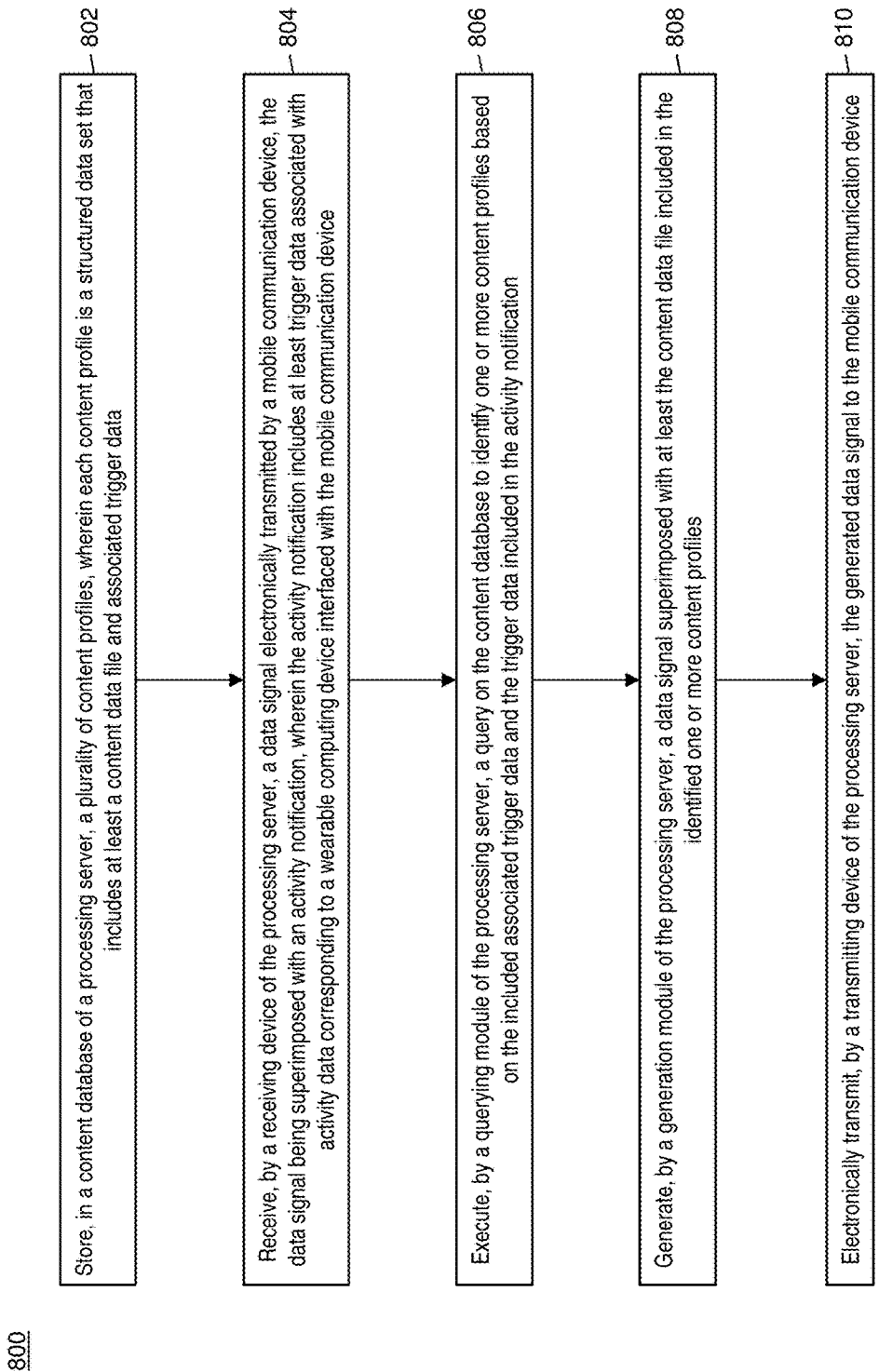
FIG. 8 is a flow chart illustrating an exemplary method for distributing content to a mobile communication device in accordance with exemplary embodiments.

FIG. 8 illustrates a method 800 for the distribution of content to a mobile communication device based on activity data measured by a wearable computing device via the use of standardized event triggers.

In step 802, a plurality of content profiles (e.g., content profiles 216) may be stored in a content database (e.g., the content database 214) of a processing server (e.g., the processing server 102), wherein each content profile is a structured data set that includes at least a content data file and associated trigger data. In step 804, a data signal electronically transmitted by a mobile communication device (e.g., the communication device 106) may be received by a receiving device (e.g., the receiving device 202) of the processing server, the data signal being superimposed with an activity notification, wherein the activity notification includes at least trigger data associated with activity data corresponding to a wearable computing device (e.g., wearable computing device 104) interfaced with the mobile communication device.

In step 806, a query may be executed on the content database by a querying module (e.g., the querying module 218) of the processing server 102 to identify one or more content profiles based on the included associated trigger data and the trigger data included in the activity notification. In step 808, a data signal superimposed with at least the content data file included in the identified one or more content profiles may be generated by a generation module (e.g., the generation module 220) of the processing server. In step 810, the generated data signal may be electronically transmitted by a transmitting device (e.g., the transmitting device 226) of the processing server to the mobile communication device.

In one embodiment, the method 800 may further include storing, in a trigger database (e.g., the trigger database 210) of the processing server, a plurality of trigger profiles (e.g., trigger profiles 212), wherein each trigger profile is a structured data set that includes data related to activity of a wearable computing device including at least a trigger identifier and detailed trigger data. In a further embodiment, the trigger data included in the activity notification may comprise a specific trigger identifier, and the method 800 may even further comprise: executing, by the querying module of the processing server, a query on the trigger database to identify a specific trigger profile where the included trigger identifier corresponds to the specific trigger identifier, wherein the trigger data included in each of the identified one or more content profiles corresponds to the detailed trigger data included in the identified specific trigger profile. In another further embodiment, the method 800 may even further comprise: receiving, by the receiving device of the processing server, a data signal superimposed with a content submission, wherein the content submission includes at least an activity unit, an activity value, and an associated content data file; executing, by the querying module of the processing server, a query on the trigger database to identify a specific trigger profile where the included detailed trigger data includes the activity unit and activity value; and storing, in the content database of the processing server, a new content profile where the included content data file is the associated content data file and the included associated trigger data includes the trigger identifier included in the identified specific trigger profile.

In one embodiment, the trigger data may include at least one of: a trigger identifier, a trigger unit, a trigger value, and an application program identifier. In some embodiments, the activity data may include at least one of: an activity unit and an activity value. In a further embodiment, the activity unit may be one of: steps, stairs, floors, calories, miles, kilometers, feet, minutes, hours, laps, songs, books, articles, playlists, movies, videos, stations, checkpoints, and locations.

In one embodiment, the trigger data included in the activity notification may include a specific trigger identifier, and the trigger data included in each of the identified one or more content profiles may include the specific trigger identifier. In some embodiments, the trigger data may include at least an application program identifier associated with an application program executed by the mobile communication device configured to identify the activity data corresponding to the wearable computing device. In one embodiment, the content data file may be at least one of: an image file, audio file, video file, and executable file.

Figure 9:
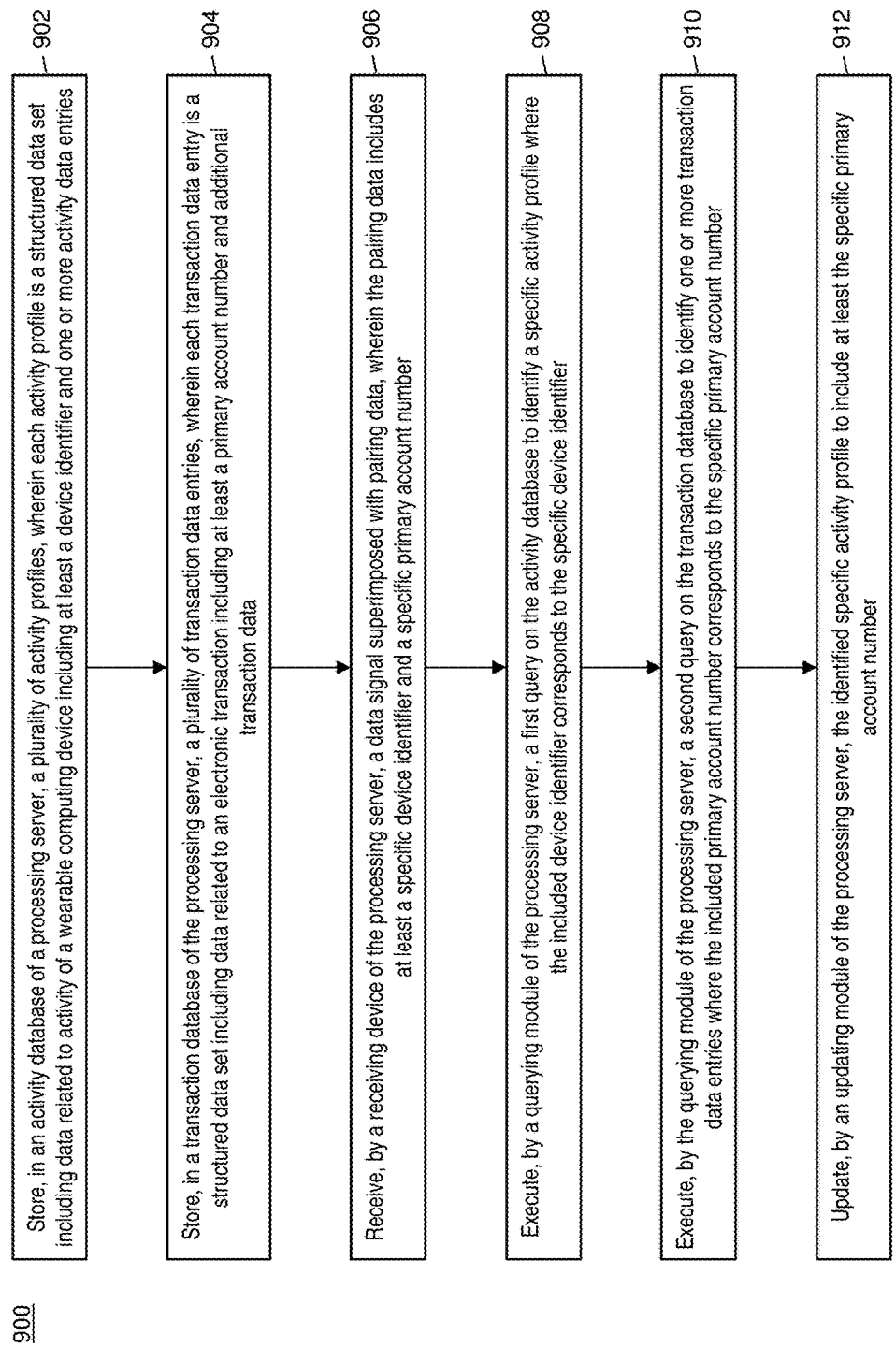
FIG. 9 is a flow chart illustrating an exemplary method for pairing wearable computing device activity data with additional data in accordance with exemplary embodiments.

Exemplary Method for Pairing Wearable Computing Device Activity Data with Additional Data FIG. 9 illustrates a method 900 for the pairing of standardized activity data for wearable computing device activity measured using standardized event triggers with additional data corresponding to electronic payment transactions.

In step 902, a plurality of activity profiles may be stored in an activity database of a processing server (e.g., the processing server 102), wherein each activity profile is a structured data set including data related to activity of a wearable computing device including at least a device identifier and one or more activity data entries. In step 904, a plurality of transaction data entries may be stored in a transaction database of the processing server, wherein each transaction data entry is a structured data set including data related to an electronic transaction including at least a primary account number and additional transaction data.

In step 906, a data signal superimposed with pairing data may be received by a receiving device (e.g., the receiving device 202) of the processing server, wherein the pairing data includes at least a specific device identifier and a specific primary account number. In step 908, a first query may be executed on the activity database by a querying module (e.g., the querying module 218) of the processing server to identify a specific activity profile where the included device identifier corresponds to the specific device identifier.

In step 910, a second query may be executed on the transaction database by the querying module of the processing server to identify one or more transaction data entries where the included primary account number corresponds to the specific primary account number. In step 912, the identified specific activity profile may be updated by an updating module (e.g., the updating module 222) of the processing server to include at least the specific primary account number.

In one embodiment, the updated identified specific activity profile may further include each of the identified one or more transaction data entries. In some embodiments, the method 900 may further include: identifying, by an analytic module (e.g., the analytic module 224) of the processing server, one or more transaction behaviors based on at least the additional transaction data included in at least one of the identified one or more transaction data entries, wherein the updated identified specific activity profile may further include the identified one or more transaction behaviors. In one embodiment, the method 900 may also include: receiving, by the receiving device of the processing server, a data signal superimposed with an activity notification, wherein the activity notification includes at least the specific device identifier; and electronically transmitting, by a transmitting device (e.g. the transmitting device 226) of the processing server, at least a portion of the additional transaction data included in at least one of the identified one or more transaction data entries.

In one embodiment, the method 900 may also include: storing, in a content database (e.g., the content database 214) of the processing server, a plurality of content profiles (e.g., content profiles 216), wherein each content profile is a structured data set that includes at least a content data file, trigger data, and at least one transaction behavior. In a further embodiment, the method 900 may even further include: receiving, by the receiving device of the processing server, a data signal superimposed with an activity notification from a mobile communication device (e.g., the communication device 106), wherein the activity notification includes at least the specific device identifier and specific trigger data associated with activity data corresponding to a wearable computing device interfaced with the mobile communication device; identifying, by the analytic module of the processing server, one or more transaction behaviors based on at least the additional transaction data included in at least one of the identified one or more transaction data entries; and executing, by the querying module of the processing server, a query on the content database to identify a specific content profile where the included trigger data corresponds to the specific trigger data and where the included at least one transaction behavior is included in the identified one or more transaction behaviors. In an even further embodiment, the method 900 may further include: electronically transmitting, by the transmitting device of the processing server, a data signal superimposed with at least the content data file included in the identified specific content profile to the mobile communication device.

In some embodiments, the method 900 may also include: executing, by the querying module of the processing server, a third query on the activity database to identify a second activity profile that further includes the specific primary account number. In a further embodiment, the method 900 may further include: updating, by the updating module of the processing server, the identified second activity profile to include at least the specific device identifier, wherein the updated identified specific activity profile further includes the device identifier included in the identified second account profile. In another further embodiment, the updated identified specific activity profile may further include the one or more activity data entries included in the identified second activity profile.

Payment Transaction Processing System and Process

Figure 10:
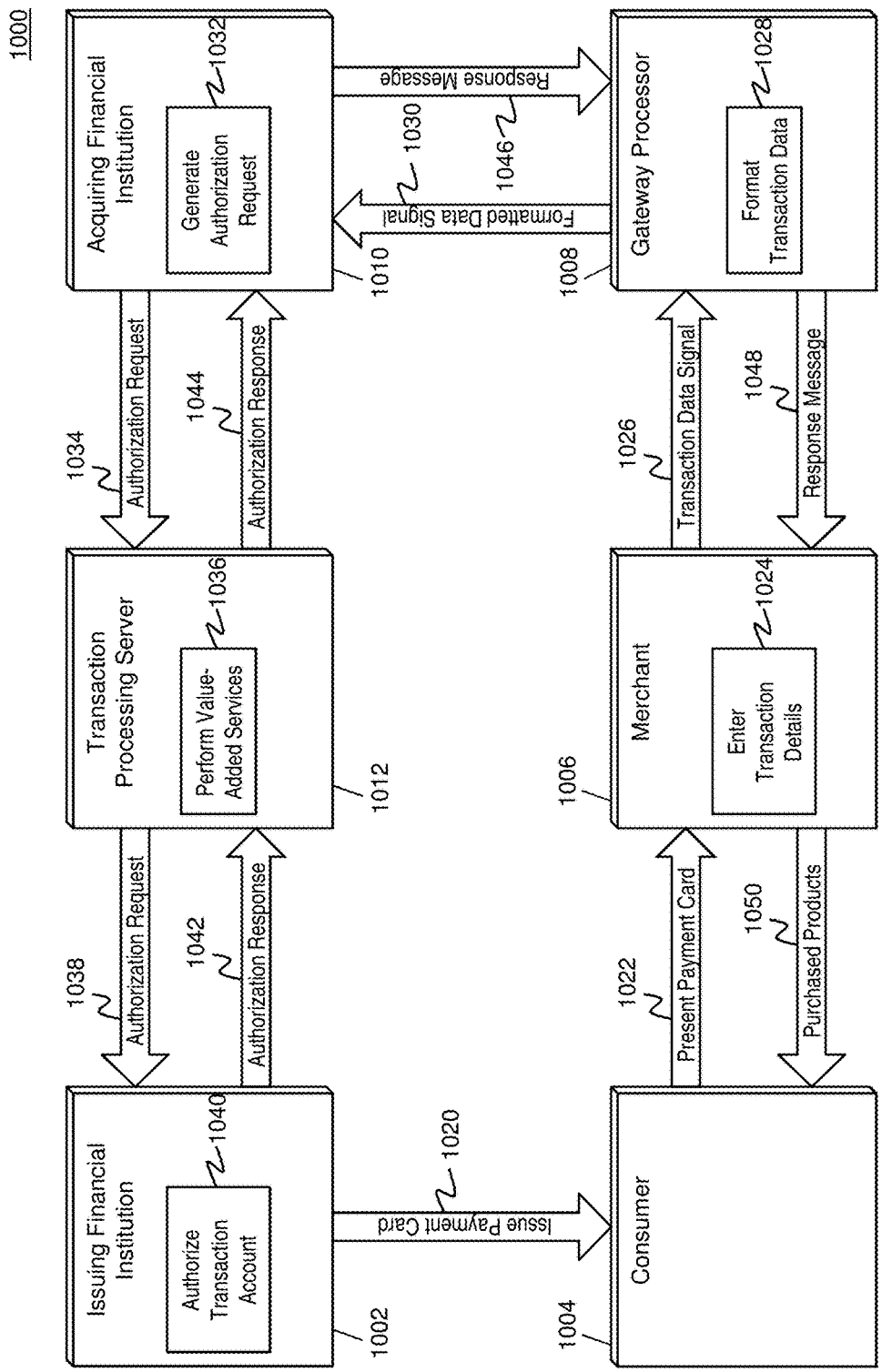
FIG. 10 is a flow diagram illustrating the processing of a payment transaction in accordance with exemplary embodiments.

FIG. 10 illustrates a transaction processing system and a process 1000 for the processing of payment transactions in the system. The process 1000 and steps included therein may be performed by one or more components of the system 100 discussed above, such as the processing server 102, wearable computing device 104, communication device 106, payment network 112, etc. The processing of payment transactions using the system and process 1000 illustrated in FIG. 10 and discussed below may utilize the payment rails, which may be comprised of the computing devices and infrastructure utilized to perform the steps of the process 1000 as specially configured and programmed by the entities discussed below, including the transaction processing server 1012, which may be associated with one or more payment networks configured to processing payment transactions. It will be apparent to persons having skill in the relevant art that the process 1000 may be incorporated into the processes illustrated in FIGS. 5-9, discussed above, with respect to the step or steps involved in the processing of a payment transaction. In addition, the entities discussed herein for performing the process 1000 may include one or more computing devices or systems configured to perform the functions discussed below. For instance, the merchant 1006 may be comprised of one or more point of sale devices, a local communication network, a computing server, and other devices configured to perform the functions discussed below.

In step 1020, an issuing financial institution 1002 may issue a payment card or other suitable payment instrument to a consumer 1004. The issuing financial institution may be a financial institution, such as a bank, or other suitable type of entity that administers and manages payment accounts and/ or payment instruments for use with payment accounts that can be used to fund payment transactions. The consumer 1004 may have a transaction account with the issuing financial institution 1002 for which the issued payment card is associated, such that, when used in a payment transaction, the payment transaction is funded by the associated transaction account. In some embodiments, the payment card may be issued to the consumer 1004 physically. In other embodiments, the payment card may be a virtual payment card or otherwise provisioned to the consumer 1004 in an electronic format.

In step 1022, the consumer 1004 may present the issued payment card to a merchant 1006 for use in funding a payment transaction. The merchant 1006 may be a business, another consumer, or any entity that may engage in a payment transaction with the consumer 1004. The payment card may be presented by the consumer 1004 via providing the physical card to the merchant 1006, electronically transmitting (e.g., via near field communication, wireless transmission, or other suitable electronic transmission type and protocol) payment details for the payment card, or initiating transmission of payment details to the merchant 1006 via a third party. The merchant 1006 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 1024, the merchant 1006 may enter transaction details into a point of sale computing system. The transaction details may include the payment details provided by the consumer 1004 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 1006 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 1006 may be an online retailer in an e-commerce transaction. In such embodiments, the transaction details may be entered in a shopping cart or other repository for storing transaction data in an electronic transaction as will be apparent to persons having skill in the relevant art.

In step 1026, the merchant 1006 may electronically transmit a data signal superimposed with transaction data to a gateway processor 1008. The gateway processor 1008 may be an entity configured to receive transaction details from a merchant 1006 for formatting and transmission to an acquiring financial institution 1010. In some instances, a gateway processor 1008 may be associated with a plurality of merchants 1006 and a plurality of acquiring financial institutions 1010. In such instances, the gateway processor 1008 may receive transaction details for a plurality of different transactions involving various merchants, which may be forwarded on to appropriate acquiring financial institutions 1010. By having relationships with multiple acquiring financial institutions 1010 and having the requisite infrastructure to communicate with financial institutions using the payment rails, such as using application programming interfaces associated with the gateway processor 1008 or financial institutions used for the submission, receipt, and retrieval of data, a gateway processor 1008 may act as an intermediary for a merchant 1006 to be able to conduct payment transactions via a single communication channel and format with the gateway processor 1008, without having to maintain relationships with multiple acquiring financial institutions 1010 and payment processors and the hardware associated thereto. Acquiring financial institutions 1010 may be financial institutions, such as banks, or other entities that administers and manages payment accounts and/or payment instruments for use with payment accounts. In some instances, acquiring financial institutions 1010 may manage transaction accounts for merchants 1006. In some cases, a single financial institution may operate as both an issuing financial institution 1002 and an acquiring financial institution 1010.

The data signal transmitted from the merchant 1006 to the gateway processor 1008 may be superimposed with the transaction details for the payment transaction, which may be formatted based on one or more standards. In some embodiments, the standards may be set forth by the gateway processor 1008, which may use a unique, proprietary format for the transmission of transaction data to/from the gateway processor 1008. In other embodiments, a public standard may be used, such as the International Organization for Standardization's ISO 81083 standard. The standard may indicate the types of data that may be included, the formatting of the data, how the data is to be stored and transmitted, and other criteria for the transmission of the transaction data to the gateway processor 1008.

In step 1028, the gateway processor 1008 may parse the transaction data signal to obtain the transaction data superimposed thereon and may format the transaction data as necessary. The formatting of the transaction data may be performed by the gateway processor 1008 based on the proprietary standards of the gateway processor 1008 or an acquiring financial institution 1010 associated with the payment transaction. The proprietary standards may specify the type of data included in the transaction data and the format for storage and transmission of the data. The acquiring financial institution 1010 may be identified by the gateway processor 1008 using the transaction data, such as by parsing the transaction data (e.g., deconstructing into data elements) to obtain an account identifier included therein associated with the acquiring financial institution 1010. In some instances, the gateway processor 1008 may then format the transaction data based on the identified acquiring financial institution 1010, such as to comply with standards of formatting specified by the acquiring financial institution 1010. In some embodiments, the identified acquiring financial institution 1010 may be associated with the merchant 1006 involved in the payment transaction, and, in some cases, may manage a transaction account associated with the merchant 1006.

In step 1030, the gateway processor 1008 may electronically transmit a data signal superimposed with the formatted transaction data to the identified acquiring financial institution 1010. The acquiring financial institution 1010 may receive the data signal and parse the signal to obtain the formatted transaction data superimposed thereon. In step 1032, the acquiring financial institution may generate an authorization request for the payment transaction based on the formatted transaction data. The authorization request may be a specially formatted transaction message that is formatted pursuant to one or more standards, such as the ISO 81083 standard and standards set forth by a payment processor used to process the payment transaction, such as a payment network. The authorization request may be a transaction message that includes a message type indicator indicative of an authorization request, which may indicate that the merchant 1006 involved in the payment transaction is requesting payment or a promise of payment from the issuing financial institution 1002 for the transaction. The authorization request may include a plurality of data elements, each data element being configured to store data as set forth in the associated standards, such as for storing an account number, application cryptogram, transaction amount, issuing financial institution 1002 information, etc.

In step 1034, the acquiring financial institution 1010 may electronically transmit the authorization request to a transaction processing server 1012 for processing. The transaction processing server 1012 may be comprised of one or more computing devices as part of a payment network configured to process payment transactions. In some embodiments, the authorization request may be transmitted by a transaction processor at the acquiring financial institution 1010 or other entity associated with the acquiring financial institution. The transaction processor may be one or more computing devices that include a plurality of communication channels for communication with the transaction processing server 1012 for the transmission of transaction messages and other data to and from the transaction processing server 1012. In some embodiments, the payment network associated with the transaction processing server 1012 may own or operate each transaction processor such that the payment network may maintain control over the communication of transaction messages to and from the transaction processing server 1012 for network and informational security.

In step 1036, the transaction processing server 1012 may perform value-added services for the payment transaction. Value-added services may be services specified by the issuing financial institution 1002 that may provide additional value to the issuing financial institution 1002 or the consumer 1004 in the processing of payment transactions. Value-added services may include, for example, fraud scoring, transaction or account controls, account number mapping, offer redemption, loyalty processing, etc. For instance, when the transaction processing server 1012 receives the transaction, a fraud score for the transaction may be calculated based on the data included therein and one or more fraud scoring algorithms and/or engines. In some instances, the transaction processing server 1012 may first identify the issuing financial institution 1002 associated with the transaction, and then identify any services indicated by the issuing financial institution 1002 to be performed. The issuing financial institution 1002 may be identified, for example, by data included in a specific data element included in the authorization request, such as an issuer identification number. In another example, the issuing financial institution 1002 may be identified by the primary account number stored in the authorization request, such as by using a portion of the primary account number (e.g., a bank identification number) for identification.

In step 1038, the transaction processing server 1012 may electronically transmit the authorization request to the issuing financial institution 1002. In some instances, the authorization request may be modified, or additional data included in or transmitted accompanying the authorization request as a result of the performance of value-added services by the transaction processing server 1012. In some embodiments, the authorization request may be transmitted to a transaction processor (e.g., owned or operated by the transaction processing server 1012) situated at the issuing financial institution 1002 or an entity associated thereof, which may forward the authorization request to the issuing financial institution 1002.

In step 1040, the issuing financial institution 1002 may authorize the transaction account for payment of the payment transaction. The authorization may be based on an available credit amount for the transaction account and the transaction amount for the payment transaction, fraud scores provided by the transaction processing server 1012, and other considerations that will be apparent to persons having skill in the relevant art. The issuing financial institution 1002 may modify the authorization request to include a response code indicating approval (e.g., or denial if the transaction is to be denied) of the payment transaction. The issuing financial institution 1002 may also modify a message type indicator for the transaction message to indicate that the transaction message is changed to be an authorization response. In step 1042, the issuing financial institution 1002 may transmit (e.g., via a transaction processor) the authorization response to the transaction processing server 1012.

In step 1044, the transaction processing server 1012 may forward the authorization response to the acquiring financial institution 1010 (e.g., via a transaction processor). In step 1046, the acquiring financial institution may generate a response message indicating approval or denial of the payment transaction as indicated in the response code of the authorization response, and may transmit the response message to the gateway processor 1008 using the standards and protocols set forth by the gateway processor 1008. In step 1048, the gateway processor 1008 may forward the response message to the merchant 1006 using the appropriate standards and protocols. In step 10100, the merchant 1006 may then provide the products purchased by the consumer 1004 as part of the payment transaction to the consumer 1004.

In some embodiments, once the process 1000 has completed, payment from the issuing financial institution 1002 to the acquiring financial institution 1010 may be performed. In some instances, the payment may be made immediately or within one business day. In other instances, the payment may be made after a period of time, and in response to the submission of a clearing request from the acquiring financial institution 1010 to the issuing financial institution 1002 via the transaction processing server 1002. In such instances, clearing requests for multiple payment transactions may be aggregated into a single clearing request, which may be used by the transaction processing server 1012 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 1040), the transaction processing server 1012 may be configured to perform authorization of transactions on behalf of the issuing financial institution 1002. Such actions may be referred to as "stand-in processing," where the transaction processing server "stands in" as the issuing financial institution 1002. In such instances, the transaction processing server 1012 may utilize rules set forth by the issuing financial institution 1002 to determine approval or denial of the payment transaction, and may modify the transaction message accordingly prior to forwarding to the acquiring financial institution 1010 in step 1044. The transaction processing server 1012 may retain data associated with transactions for which the transaction processing server 1012 stands in, and may transmit the retained data to the issuing financial institution 1002 once communication is reestablished. The issuing financial institution 1002 may then process transaction accounts accordingly to accommodate for the time of lost communication.

In another example, if the transaction processing server 1012 is unavailable for submission of the authorization request by the acquiring financial institution 1010, then the transaction processor at the acquiring financial institution 1010 may be configured to perform the processing of the transaction processing server 1012 and the issuing financial institution 1002. The transaction processor may include rules and data suitable for use in making a determination of approval or denial of the payment transaction based on the data included therein. For instance, the issuing financial institution 1002 and/or transaction processing server 1012 may set limits on transaction type, transaction amount, etc. that may be stored in the transaction processor and used to determine approval or denial of a payment transaction based thereon. In such instances, the acquiring financial institution 1010 may receive an authorization response for the payment transaction even if the transaction processing server 1012 is unavailable, ensuring that transactions are processed and no downtime is experienced even in instances where communication is unavailable. In such cases, the transaction processor may store transaction details for the payment transactions, which may be transmitted to the transaction processing server 1012 (e.g., and from there to the associated issuing financial institutions 1002) once communication is reestablished.

In some embodiments, transaction processors may be configured to include a plurality of different communication channels, which may utilize multiple communication cards and/or devices, to communicate with the transaction processing server 1012 for the sending and receiving of transaction messages. For example, a transaction processor may be comprised of multiple computing devices, each having multiple communication ports that are connected to the transaction processing server 1012. In such embodiments, the transaction processor may cycle through the communication channels when transmitting transaction messages to the transaction processing server 1012, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 1010 may identify that an authorization request involves an issuing financial institution 1002 (e.g., via the bank identification number included in the transaction message) for which no value-added services are required. The transaction processor at the acquiring financial institution 1010 may then transmit the authorization request directly to the transaction processor at the issuing financial institution 1002 (e.g., without the authorization request passing through the transaction processing server 1012), where the issuing financial institution 1002 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 1012 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 1008, acquiring financial institution 1010, etc.) for processing using this advanced network, and to quickly and efficiently receive a response regarding the ability for a consumer 1004 to fund the payment transaction.

Computer System Architecture

Figure 11:
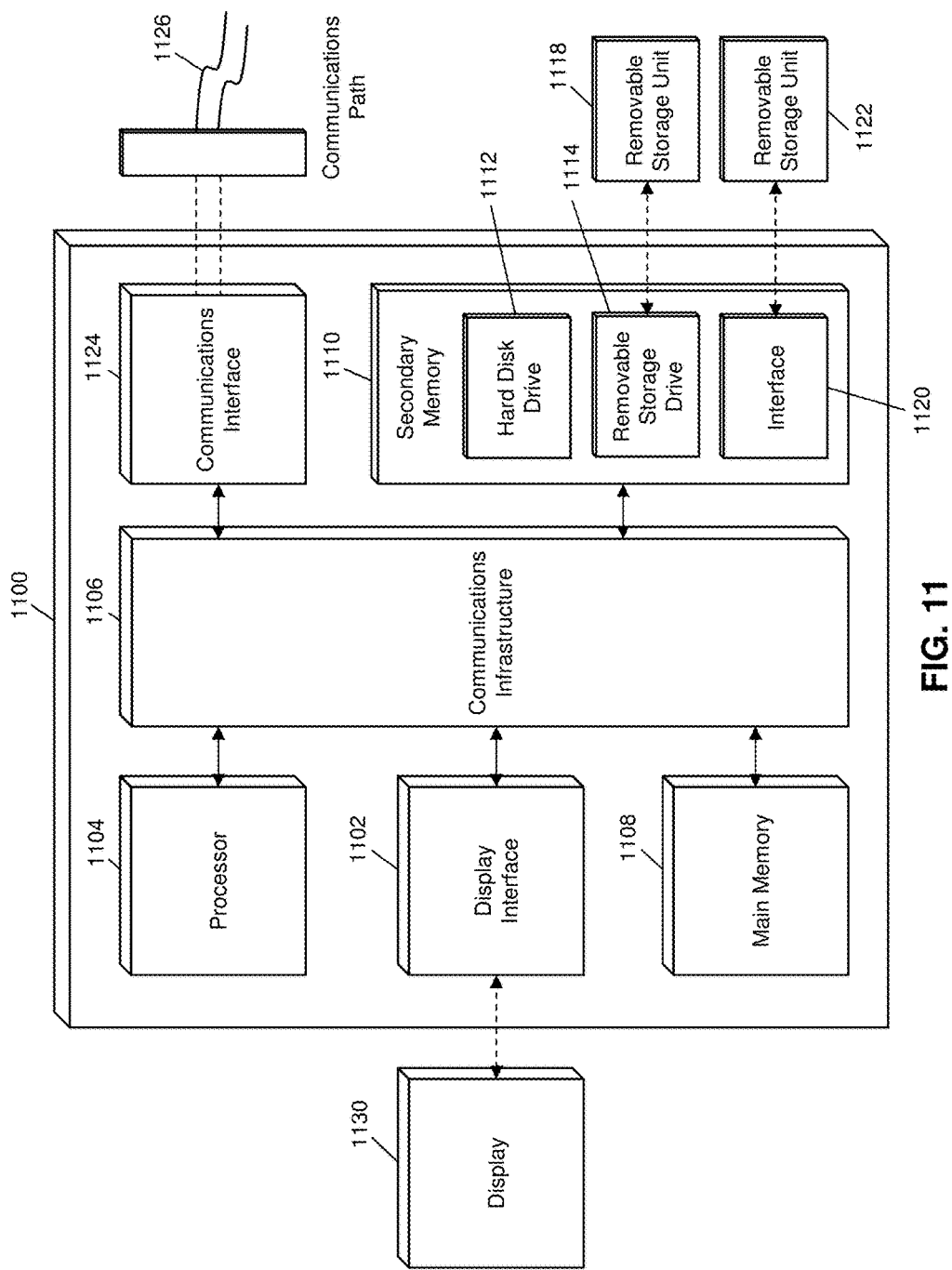
FIG. 11 is a block diagram illustrating a computer system architecture in accordance with exemplary embodiments.

FIG. 11 illustrates a computer system 1100 in which embodiments of the present disclosure, or portions thereof, may be implemented as computer-readable code. For example, the processing server 102 of FIG. 1 may be implemented in the computer system 1100 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 5-10.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1118, a removable storage unit 1122, and a hard disk installed in hard disk drive 1112.

Various embodiments of the present disclosure are described in terms of this example computer system 1100. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1104 may be a special purpose or a general purpose processor device specifically configured to perform the functions discussed herein. The processor device 1104 may be connected to a communications infrastructure 1106, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1100 may also include a main memory 1108 (e.g., random access memory, read-only memory, etc.), and may also include a secondary memory 1110. The secondary memory 1110 may include the hard disk drive 1112 and a removable storage drive 1114, such as a floppy disk drive, a magnetic tape drive, an optical disk drive, a flash memory, etc.

The removable storage drive 1114 may read from and/or write to the removable storage unit 1118 in a well-known manner. The removable storage unit 1118 may include a removable storage media that may be read by and written to by the removable storage drive 1114. For example, if the removable storage drive 1114 is a floppy disk drive or universal serial bus port, the removable storage unit 1118 may be a floppy disk or portable flash drive, respectively. In one embodiment, the removable storage unit 1118 may be non-transitory computer readable recording media.

In some embodiments, the secondary memory 1110 may include alternative means for allowing computer programs or other instructions to be loaded into the computer system 1100, for example, the removable storage unit 1122 and an interface 1120. Examples of such means may include a program cartridge and cartridge interface (e.g., as found in video game systems), a removable memory chip (e.g., EEPROM, PROM, etc.) and associated socket, and other removable storage units 1122 and interfaces 1120 as will be apparent to persons having skill in the relevant art.

Data stored in the computer system 1100 (e.g., in the main memory 1108 and/or the secondary memory 1110) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1100 may also include a communications interface 1124. The communications interface 1124 may be configured to allow software and data to be transferred between the computer system 1100 and external devices. Exemplary communications interfaces 1124 may include a modem, a network interface (e.g., an Ethernet card), a communications port, a PCMCIA slot and card, etc. Software and data transferred via the communications interface 1124 may be in the form of signals, which may be electronic, electromagnetic, optical, or other signals as will be apparent to persons having skill in the relevant art. The signals may travel via a communications path 1126, which may be configured to carry the signals and may be implemented using wire, cable, fiber optics, a phone line, a cellular phone link, a radio frequency link, etc.

The computer system 1100 may further include a display interface 1102. The display interface 1102 may be configured to allow data to be transferred between the computer system 1100 and external display 1130. Exemplary display interfaces 1102 may include high-definition multimedia interface (HDMI), digital visual interface (DVI), video graphics array (VGA), etc. The display 1130 may be any suitable type of display for displaying data transmitted via the display interface 1102 of the computer system 1100, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1108 and secondary memory 1110, which may be memory semiconductors (e.g., DRAMs, etc.). These computer program products may be means for providing software to the computer system 1100. Computer programs (e.g., computer control logic) may be stored in the main memory 1108 and/or the secondary memory 1110. Computer programs may also be received via the communications interface 1124. Such computer programs, when executed, may enable computer system 1100 to implement the present methods as discussed herein. In particular, the computer programs, when executed, may enable processor device 1104 to implement the methods illustrated by FIGS. 5-10, as discussed herein. Accordingly, such computer programs may represent controllers of the computer system 1100. Where the present disclosure is implemented using software, the software may be stored in a computer program product and loaded into the computer system 1100 using the removable storage drive 1114, interface 1120, and hard disk drive 1112, or communications interface 1124.

The processor device 1104 may comprise one or more modules or engines configured to perform the functions of the computer system 1100. Each of the modules or engines may be implemented using hardware and, in some instances, may also utilize software, such as corresponding to program code and/or programs stored in the main memory 1108 or secondary memory 1110. In such instances, program code may be compiled by the processor device 1104 (e.g., by a compiling module or engine) prior to execution by the hardware of the computer system 1100. For example, the program code may be source code written in a programming language that is translated into a lower level language, such as assembly language or machine code, for execution by the processor device 1104 and/or any additional hardware components of the computer system 1100. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1100 to perform the functions disclosed herein. It will be apparent to persons having skill in the relevant art that such processes result in the computer system 1100 being a specially configured computer system 1100 uniquely programmed to perform the functions discussed above.

Techniques consistent with the present disclosure provide, among other features, systems and methods for establishing trigger events for wearable computing device activity, distributing content to a mobile communication device, and pairing wearable computing device activity data with additional data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for establishing trigger events for wearable computing device activity, comprising:
    receiving, by a receiving device of a processing server, a data signal electronically transmitted by a computing device, wherein the data signal is superimposed with a trigger event submission, the trigger event submission including at least an activity unit type, one or more activity unit values, and an application identifier associated with an application program corresponding to a wearable computing device;
    storing, in a framework database of the processing server, an activity unit profile, wherein the activity unit profile includes at least the application identifier and the activity unit type;
    storing, in a trigger database of the processing server, a trigger profile for each activity unit value of the one or more activity unit values, wherein each trigger profile includes at least the application identifier and the respective activity unit value;
    storing, in a content database of the processing server, a content profile;
    electronically transmitting, by a transmitting device of the processing server, a data signal superimposed with a confirmation notification indicative of confirmation of storage of the trigger profile for each activity unit value to the computing device;
    repeating, by the processing server, the receiving, storing, and transmitting steps for one or more additional trigger event submissions where the application identifier included in each trigger event submission is a unique application identifier;
    receiving, by the receiving device of the processing server, a data signal superimposed with a content submission, wherein the content submission includes at least a content data file, a specific activity unit type, and a specific activity unit value;
    executing, by a querying module of the processing server, a query on the framework database to identify a plurality of specific activity unit profiles where the included activity unit type corresponds to the specific activity unit type and where at least two of the application identifiers included in the respective specific activity unit profiles are unique;
    executing, by the querying module of the processing server, a query on the trigger database to identify a plurality of specific trigger profiles where the included application identifier corresponds to the application identifier included in one of the specific activity unit profiles and the unit activity value corresponds to the specific activity unit value; and
    updating, by an updating module of the processing server, the content profile, to include at least the content data file and a unique trigger identifier included in each of the identified plurality of specific trigger profiles.

2. The method of claim 1, wherein each trigger profile further includes a trigger identifier unique to the respective trigger profile.

3. The method of claim 2, further comprising:
receiving, by the receiving device of the processing server, a data signal superimposed with an activity notification, wherein the activity notification includes at least a specific activity unit value associated with activity corresponding to a wearable computing device and a specific application identifier;
executing, by a querying module of the processing server, a query on the trigger database to identify a specific trigger profile where the included application identifier and activity unit value correspond to the specific activity unit value and specific application identifier included in the activity notification, respectively; and
electronically transmitting, by the transmitting device of the processing server, a data signal superimposed with at least the unique trigger identifier included in the identified specific trigger profile.

4. The method of claim 1, wherein the content data file is at least one of: an image file, an audio file, a video file, and an executable file.

5. The method of claim 1, wherein the activity unit type is one of: steps, stairs, floors, calories, miles, kilometers, feet, minutes, hours, laps, songs, books, articles, playlists, movies, videos, stations, checkpoints, and locations.

6. The method of claim 1, wherein the activity unit value is an integer.

7. The method of claim 1, wherein the activity unit type is a combined measurement unit and value.

8. The method of claim 1, wherein the data signal is received via an application programming interface associated with the processing server.

9. A system for establishing trigger events for wearable computing device activity, comprising:
a receiving device of a processing server configured to receive a data signal electronically transmitted by a computing device, wherein the data signal is superimposed with a trigger event submission, the trigger event submission including at least an activity unit type, one or more activity unit values, and an application identifier associated with an application program corresponding to a wearable computing device;
a framework database of the processing server configured to store an activity unit profile, wherein the activity unit profile includes at least the application identifier and the activity unit type;
a trigger database of the processing server configured to store a trigger profile for each activity unit value of the one or more activity unit values, wherein each trigger profile includes at least the application identifier and the respective activity unit value;
a content database of the processing server configured to store a content profile;
a transmitting device of the processing server configured to electronically transmit a data signal superimposed with a confirmation notification indicative of confirmation of storage of the trigger profile for each activity unit value to the computing device;
a content database of the processing server;
an updating module of the processing server; and
a querying module of the processing server, wherein
the processing server is configured to repeat the receiving, storing, and transmitting for one or more additional trigger event submissions where the application identifier is included in each trigger event submission is a unique application identifier,
the receiving device of the processing server is further configured to receive a data signal superimposed with a content submission, wherein the content submission includes at least a content data file, a specific activity unit type, and a specific activity unit value;
the querying module of the processing server is configured to
execute a query on the framework database to identify a plurality of specific activity unit profiles where the included activity unit type corresponds to the specific activity unit type and where at least two of the application identifiers included in the respective specific activity unit profiles are unique, and
execute a query on the trigger database to identify a plurality of specific trigger profiles where the included application identifier corresponds to the application identifier included in one of the specific activity unit profiles and the unit activity value corresponds to the specific activity unit value, and
the updating module of the processing server is configured to update the content profile to include at least the content data file and a unique trigger identifier included in each of the identified plurality of specific trigger profiles.

10. The system of claim 9, wherein each trigger profile further includes a trigger identifier unique to the respective trigger profile.

11. The system of claim 10, further comprising:
a querying module of the processing server, wherein
the receiving device of the processing server is further configured to receive a data signal superimposed with an activity notification, wherein the activity notification includes at least a specific activity unit value associated with activity corresponding to a wearable computing device and a specific application identifier,
the querying module of the processing server is configured to execute a query on the trigger database to identify a specific trigger profile where the included application identifier and activity unit value correspond to the specific activity unit value and specific application identifier included in the activity notification, respectively, and
the transmitting device of the processing server is further configured to electronically transmit a data signal superimposed with at least the unique trigger identifier included in the identified specific trigger profile.

12. The system of claim 9, wherein the content data file is at least one of: an image file, an audio file, a video file, and an executable file.

13. The system of claim 9, wherein the activity unit type is one of: steps, stairs, floors, calories, miles, kilometers, feet, minutes, hours, laps, songs, books, articles, playlists, movies, videos, stations, checkpoints, and locations.

14. The system of claim 9, wherein the activity unit value is an integer.

15. The system of claim 9, wherein the activity unit type is a combined measurement unit and value.

16. The system of claim 9, wherein the data signal is received via an application programming interface associated with the processing server.

* * * * *